(12) United States Patent
Kruglick et al.

(10) Patent No.: US 6,571,029 B1
(45) Date of Patent: May 27, 2003

(54) METHOD FOR DETERMINING AND IMPLEMENTING ELECTRICAL DAMPING COEFFICIENTS

(75) Inventors: Ezekiel John Joseph Kruglick, San Diego, CA (US); William K. Smock, San Diego, CA (US)

(73) Assignee: OMM, Inc., San Diego, CA (US)

( * ) Notice: Subject to any disclaimer, the term of this patent is extended or adjusted under 35 U.S.C. 154(b) by 95 days.

(21) Appl. No.: 09/896,021

(22) Filed: Jun. 30, 2001

Related U.S. Application Data

(63) Continuation-in-part of application No. 09/783,730, filed on Feb. 13, 2001.

(51) Int. Cl.$^7$ .................................................. G02B 6/26
(52) U.S. Cl. ............................ 385/16; 385/17; 385/18
(58) Field of Search ..................... 385/16–25; 359/128, 359/224, 291–298; 248/550

(56) References Cited

U.S. PATENT DOCUMENTS 4,626,066 A    12/1986    Levinson .................. 350/96.18

(List continued on next page.)

FOREIGN PATENT DOCUMENTS

| EP | 0690329 B1 | 6/1995 |
| EP | 0880040 A3 | 5/1998 |
| EP | 0880040 A2 | 5/1998 |
| EP | 0902538 A3 | 9/1998 |
| EP | 0902538 A2 | 9/1998 |
| EP | 0962796 A2 | 5/1999 |
| WO | WO 00/75068 A2 | 12/2000 |
| WO | WO 00/75710 A2 | 12/2000 |
| WO | WO 00/77556 A1 | 12/2000 |
| WO | WO 01/01434 A1 | 1/2001 |
| WO | WO 01/03152 A1 | 1/2001 |
| WO | WO 01/06543 A2 | 1/2001 |
| WO | WO 01/27668 A2 | 4/2001 |
| WO | WO 01/28258 A2 | 4/2001 |

OTHER PUBLICATIONS

"Two–Dimensional Optical Scanner with Large Angular Rotation Realized by Self–Assembled Micro–Elevator," L. Fan and M.C. Wu, Proc. IEEE LEOS Summer Topical Meeting on Optical MEMS, Paper WB4, Monterey, CA, Aug. 20–22, 1998.

(List continued on next page.)

*Primary Examiner*—Hemang Sanghavi
(74) *Attorney, Agent, or Firm*—Arien Ferrell Aagaard & Balzan LLP

(57) ABSTRACT

In one implementation, a method for operating a plurality of MEMS devices including applying a magnitude of a selected actuation signal equal to a first substantially constant magnitude to an actuator to cause a movable structure to begin to accelerate from a first position to impact a motion stop at a second position. The method also includes decreasing the magnitude of the selected actuation signal in a first manner. The method further includes varying at least one of a start time and a duration of the decreasing magnitude of the selected actuation signal and observing a settling time of the movable structure in response to the step of varying. In some implementations, the method includes ascertaining a range of values for the start times and the corresponding durations for each of the plurality of MEMS devices that are capable of providing settling times of the movable structure in conformance with a predetermined specification based on the steps of varying and observing. Such an implementation can include using the ascertained range of values for each device and the selected actuation signal for determining an operating start time and a corresponding operating duration to construct an operating actuation signal capable of providing a settling time for all devices in conformance with the predetermined specification. The method also can include controlling a signal source with a programmed processor to selectively apply the operating actuation signal to the plurality of MEMS devices.

61 Claims, 14 Drawing Sheets

U.S. PATENT DOCUMENTS

| | | | |
|---|---|---|---|
| 4,916,635 A | | 4/1990 | Singer et al. ............... 364/513 |
| 5,638,267 A | | 6/1997 | Singhose et al. ........... 364/148 |
| 5,771,902 A | * | 6/1998 | Lee et al. |
| 5,963,367 A | | 10/1999 | Aksyuk et al. ............. 359/392 |
| 5,969,465 A | | 10/1999 | Neukermans et al. ....... 310/333 |
| 5,969,848 A | * | 10/1999 | Lee et al. |
| 5,994,159 A | | 11/1999 | Aksyuk et al. ............... 438/52 |
| 5,995,688 A | | 11/1999 | Aksyuk et al. ............... 385/14 |
| 6,388,359 B1 | * | 5/2002 | Duelli et al. |
| 6,410,912 B1 | * | 6/2002 | Villani et al. |
| 6,480,645 B1 | * | 11/2002 | Peale et al. |
| 2002/0101769 A1 | * | 8/2002 | Garverick et al. |

OTHER PUBLICATIONS

"MEMS technology for Optical Crosslinks for Micro/Nano Satellites," W. Piyawattanametha, L. Fan, S.S. Lee, G.D.Su, and M.C. Wu, International Conference on Integrated Nano/Microtechnology for Space Applications, Houston, TX, Nov. 1–6, 1998.

"Microrelay Design, Performance, and Systems," Ezekiel J.J. Kruglick, dissertation for PhD degree, University of California, Berkeley, Spring 1999, pp.28, 59, & 64.

* cited by examiner

METHOD FOR DETERMINING AND IMPLEMENTING ELECTRICAL DAMPING COEFFICIENTS

CROSS-REFERENCE TO RELATED APPLICATIONS

This application is a continuation-in-part of copending U.S. patent application Ser. No. 09/783,730 filed Feb. 13, 2001, by Kruglick, et al., entitled METHOD AND APPARATUS FOR ELECTRONIC DAMPING OF COMPLEX DYNAMIC SYSTEMS, herein incorporated by reference in its entirety. This application is also related to U.S. patent application Ser. No. 09/896,022, by Kruglick, entitled ELECTRONIC DAMPING OF MEMS DEVICES USING A LOOK-UP TABLE, filed herewith, herein incorporated by reference in its entirety.

BACKGROUND

Optical switching plays an important role in telecommunication networks, optical instrumentation, and optical signal processing systems. Optical switches can be used to turn the light output of an optical fiber on or off with respect to an output fiber, or, alternatively, to redirect the light to various different fibers, all under electronic control. Optical switches that provide switchable cross connects between an array of input fibers and an array of output fibers are often referred to as "optical cross-connects." Optical cross-connects are a fundamental building block in the development of an all-optical communications network.

There are many different types of optical switches. One general class of optical switches may be referred to as "bulk optomechanical switches" or simply "optomechanical switches." Such switches employ physical motion of one, or more, optical elements to perform optical switching. An optomechanical switch can be implemented either in a free-space approach or in a waveguide (e.g., optical fiber) approach. The free-space approach is more scalable compared to the waveguide approach.

In optomechanical switches employing the free space approach, optical signals are switched between different fibers by a number of different methods. Typically, these methods utilize selective reflection of the optical signal off of a reflective material, such as a mirror, into a fiber. The optical signal passes through free space from an input fiber to reach the mirror, and after reflection, passes through free space to an output fiber. The optical signals are typically collimated in order to minimize coupling loss of the optical signal between an input and output fiber.

Micro-Electro-Mechanical Systems or MEMS are electrical-mechanical structures typically sized on a millimeter scale or smaller. These structures are used in a wide variety of applications including for example, sensing, electrical and optical switching, and micron scale (or smaller) machinery such as robotics and motors. MEMS structures can utilize both the mechanical and electrical attributes of material to achieve desired results. Because of their small size, MEMS devices may be fabricated utilizing semiconductor processing methods and other microfabrication techniques such as thin film processing and photolithography. Once fabricated, the MEMS structures are assembled to form MEMS devices.

MEMS structures have been shown to offer many advantages for building optomechanical switches. Namely, the use of MEMS structures can significantly reduce the size, weight and cost of optomechanical switches. The switching time can also be reduced because of the lower mass of the smaller optomechanical switches.

Movable MEMS structures are capable of oscillating uncontrollably if they are not damped. Such oscillation is due to MEMS structure design and/or fabrication. For example, very low friction in the hinges of MEMS structures allows them to move easily and repeatedly bounce off of stationary objects such as motion stops. Known methods for damping MEMS structures do not provide quick and efficient damping for all types of structures. Thus, there is a need for a method and/or apparatus that provides quick and efficient damping of MEMS structures.

SUMMARY

In one implementation, a method for operating a plurality of MEMS devices including applying a magnitude of a selected actuation signal equal to a first substantially constant magnitude to an actuator to cause a movable structure to begin to accelerate from a first position to impact a motion stop at a second position. The method also includes decreasing the magnitude of the selected actuation signal in a first manner. The method further includes varying at least one of a start time and a duration of the decreasing magnitude of the selected actuation signal and observing a settling time of the movable structure in response to the step of varying. In some implementations, the method includes ascertaining a range of values for the start times and the corresponding durations for each of the plurality of MEMS devices that are capable of providing settling times of the movable structure in conformance with a predetermined specification based on the steps of varying and observing. Such an implementation can further include using the ascertained range of values for each of the plurality of MEMS devices and the selected actuation signal for determining an operating start time and a corresponding operating duration to construct an operating actuation signal capable of providing a settling time for each of the plurality of MEMS devices in conformance with the predetermined specification. In certain implementations, the method also can include controlling a signal source with a programmed processor to selectively apply the operating actuation signal to the plurality of MEMS devices.

DESCRIPTION

This application hereby incorporates by reference in its entirety, U.S. patent application Ser. No. 09/783,730, by Kruglick, et al., entitled METHOD AND APPARATUS FOR ELECTRONIC DAMPING OF COMPLEX DYNAMIC SYSTEMS, and hereby incorporates by reference in its entirety U.S. patent application Ser. No. 09/896,022, filed herewith, by Kruglick, entitled ELECTRONIC DAMPING OF MEMS DEVICES USING A LOOK-UP TABLE.

The following description is not to be taken in a limiting sense, but is made for the purpose of describing one or more embodiments of the invention. The scope of the invention should be determined with reference to the claims.

Figure 1:
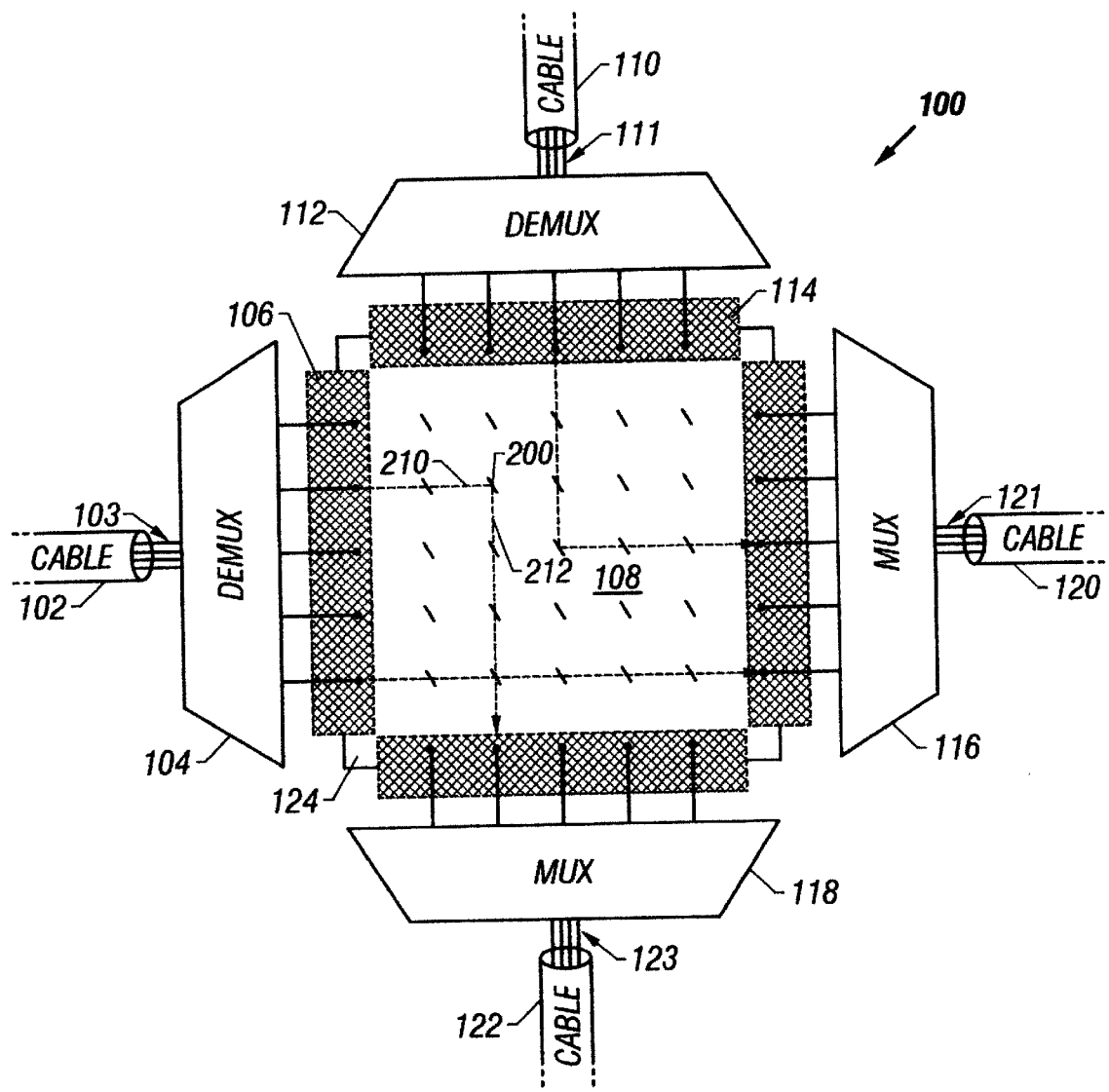
FIG. 1 is a top view illustrating a two-dimensional optical switch having MEMS switching cells.

Referring to FIG. 1, there is illustrated an optical crossbar switch 100, or simply, an optical switch 100. The optical switch 100 is a two-dimensional (2D) optical switch that is capable of providing switchable cross connects between an array of input fibers 103 and an array of output fibers 121. Specifically, the optical switch 100 provides an array of free-space optical connections between the input and output fibers 103, 121. This enables each of a plurality of optical input channels to be directed to a desired optical output channel. Each of the optical input channels may also be dropped via the dropped channel fibers 123, or other channels may be added via the add channel fibers 111 to replace certain input channels. That is, the optical switch is capable of performing optical switching as well as wavelength-selective add/drop filtering.

A cable 102 containing a plurality of input fibers 103 is incident upon a demultiplexer 104, which separates the optical beam carried by each fiber into a number of input channels. The input channels are provided, via a collimator array 106, to an array 108 of optomechanical switching cells. Similarly, a cable 110 containing a plurality of add channel fibers 111 is incident upon a demultiplexer 112 followed by a collimator array 114. The optomechanical switching cells can be configured to direct particular input channels to desired output channels, as well as to implement the channel add/drop functionality mentioned above. Separate multiplexers 116, 118 are provided for multiplexing the output channels and the "dropped" channels onto the fibers 121, 123 of separate cables 120, 122, respectively.

The array 108 of optomechanical switching cells are connected to a substrate 124. The optomechanical switching cells are preferably fabricated in accordance with Micro-Electro-Mechanical Systems (MEMS) technology. Each of the switching cells includes a mirror and an actuator. The lenses of the collimator arrays and the mirrors of each MEMS switching cell are aligned so that each switching cell can selectively intercept a beam output from one of the collimator arrays.

Figure 2:
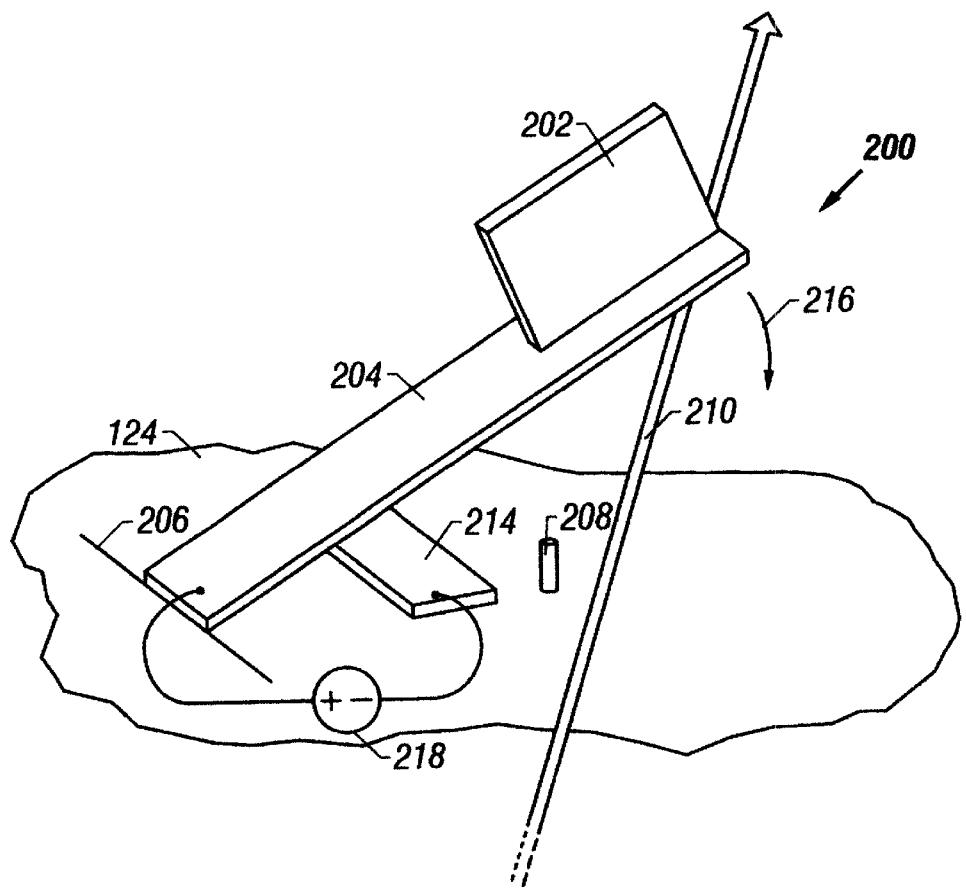
FIG. 2 is a simplified perspective view illustrating one of the MEMS switching cells shown in FIG. 1 in the transmission position.
Figure 3:
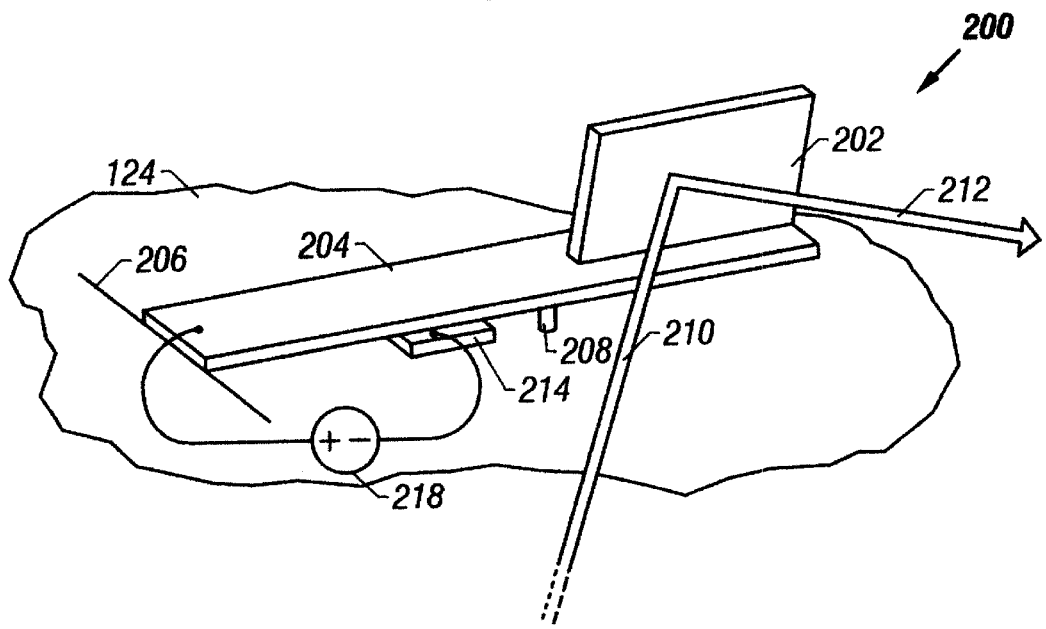
FIG. 3 is a simplified perspective view illustrating the MEMS switching cell shown in FIG. 2 in the reflection position.

FIGS. 2 and 3 are simplified diagrams illustrating an exemplary MEMS switching cell 200 that may be included in the array 108 of optomechanical switching cells. A micromirror 202 is mounted to an actuator plate 204. The actuator plate 204 is hingedly connected to the substrate 124 with a torsion hinge 206, which by way of example may be of the type described in U.S. patent application Ser. No. 09/697,762, filed Oct. 25, 2000, entitled "MEMS Optical Switch with Torsional Hinge and Method of Fabrication Thereof", by inventor Li Fan, and identified by attorney docket number 1008, the entire contents of which are hereby expressly incorporated by reference into the present application as if fully set forth herein. The micromirror 202 is shown in a vertical position with the mirror surface being perpendicular to the substrate 124. Another torsion hinge (not shown) may be used to permit the micromirror 202 to pivot relative to the actuator plate 204.

FIG. 2 illustrates the switching cell 200 in its transmission state, and FIG. 3 illustrates the switching cell 200 in its reflection state. In the reflection state, the actuator plate 204 rests on a motion stop 208 (or other landing structure) mounted on the substrate 124. By way of example, the motion stop 208 may comprise a jack stop of the type described in U.S. patent application Ser. No. 09/697,767, filed Oct. 25, 2000, entitled "MEMS Microstructure Positioner and Method of Fabrication Thereof", by inventor Li Fan, and identified by attorney docket number 1013, the entire contents of which are hereby expressly incorporated by reference into the present application as if fully set forth herein. During operation, an optical beam 210 is incident at an approximately 45° angle from the normal of the micromirror 202. By pivoting the actuator plate 204 about the torsion hinge 206, the micromirror 202 is moved in and out of the path of the optical beam 210, switching the output of the optical beam 210 between a reflection direction 212 and the transmission direction (210 of FIG. 2).

The actuator plate 204, an actuator electrode 214 mounted on the substrate 124, and the gap therebetween form an electrostatic actuator. In one embodiment, the switching cell 200 is activated by a circuit that selectively develops an electrostatic force between the actuator plate 204 and the actuator electrode 214. This force causes the actuator plate 204 and the micromirror 202 mounted thereto to pivot in angular position relative to the substrate 124, i.e., in the direction indicated by arrow 216. In other words, when a voltage bias, symbolized by voltage source 218, is applied between the actuator plate 204 and the actuator electrode 214 (or substrate 124), the actuator plate 204 is caused to draw close and contact the motion stop 208. Thus, a voltage bias is applied between the actuator plate 204 and the actuator electrode 214 to cause the switching process by electrostatic attraction. Alternate actuation methods/forces may also be used, such as for example, electromagnetic, thermal expansion, and piezoelectric. Such alternate actuation methods/forces will be discussed below.

Because of the presence of the motion stop 208, the MEMS switching cell 200 forms a complex dynamic system for purposes of analyzing the angular movement of the actuator plate 204. A complex dynamic system may also be referred to as a nonlinear system. The MEMS switching cell 200 forms a complex dynamic system because the motion stop 208 causes the actuator plate 204 to move in a vibrating manner when the actuator plate 204 impacts the motion stop 208.

Figure 4:
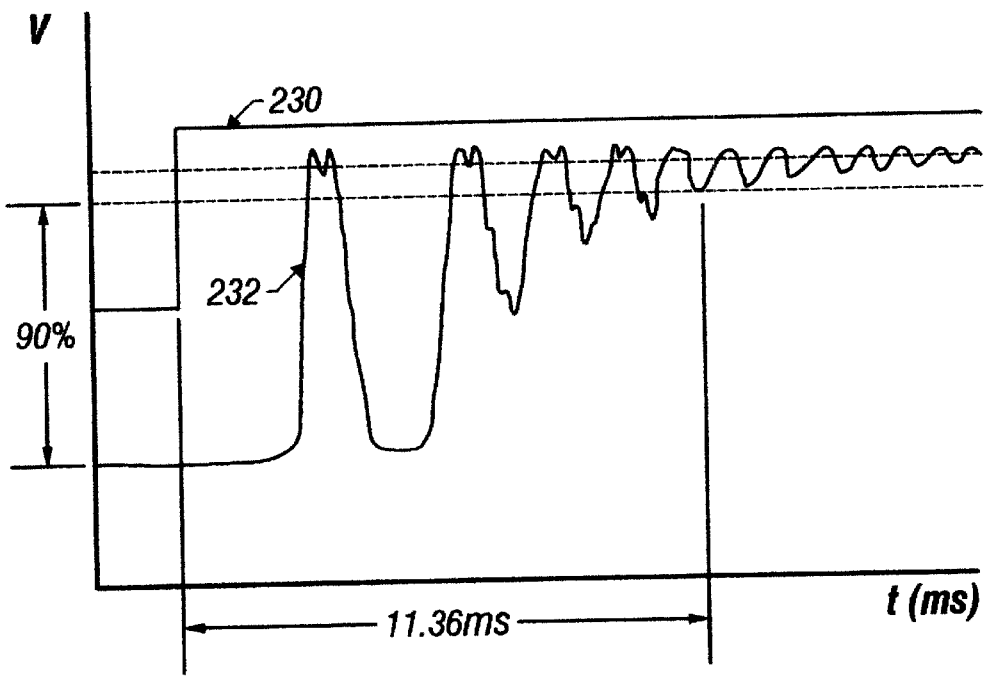
FIG. 4 is a plot illustrating an actuation signal and resulting output signal when the actuation signal is applied to the MEMS switching cell shown in FIG. 2.

In order to bring the actuator plate 204 to rest on the motion stop 208 as quickly as possible, damping is used. The damping of moving structures in complex dynamic systems is difficult, and such systems do not lend themselves to conventional methods of damping. In order to illustrate this difficulty, reference is made to FIG. 4, which illustrates a conventional actuation signal 230 and the resulting output signal 232 for the MEMS switching cell 200. In accordance with known principles, the actuation signal 230 can be made to provide effective damping in many non-complex dynamic systems that do not have motion stops. FIG. 4 illustrates the result of application of the actuation signal 230 to the switching cell 200, which is a complex dynamic system.

The actuation signal 230 is applied to the electrostatic actuator, i.e., between the actuator plate 204 and the actuator electrode 214, to create a force that pulls the actuator plate 204 towards the motion stop 208. The resulting output signal 232 represents the optical power of the output optical beam 212 that is reflected off of the micromirror 202.

Figure 5:
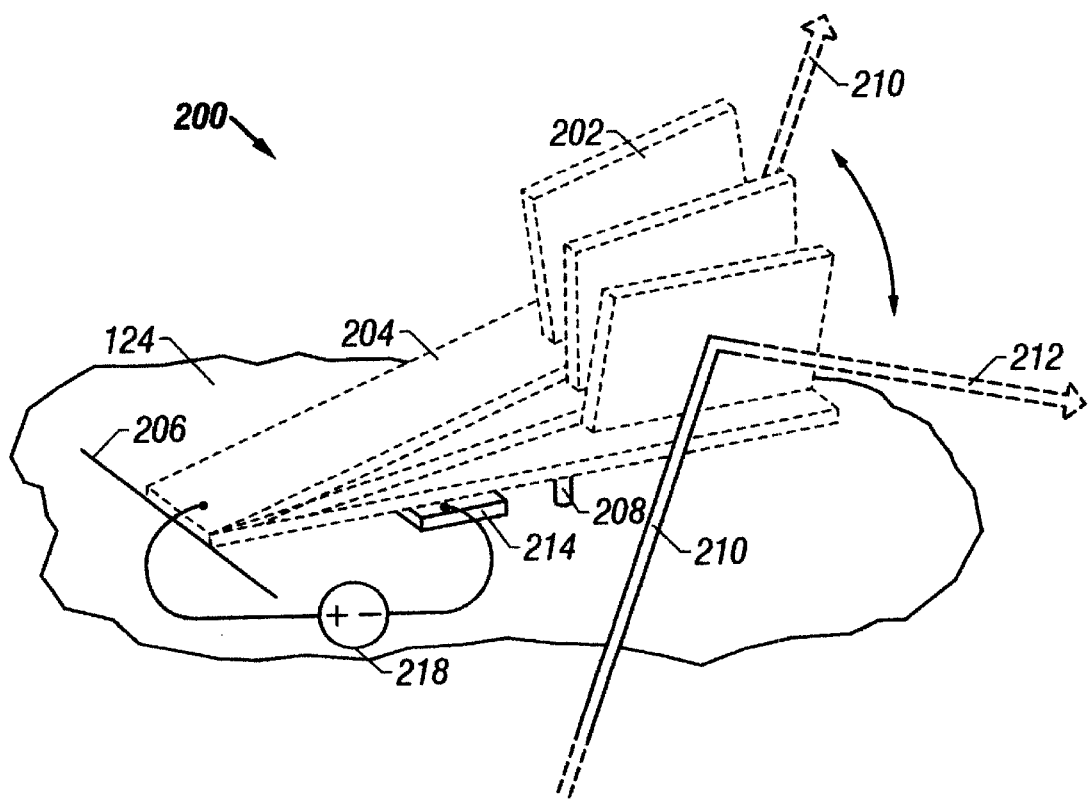
FIG. 5 is a simplified perspective view illustrating the actuator plate of the MEMS switching cell shown in FIG. 2 bouncing off of the motion stop.

As illustrated, shortly after the actuation signal 230 is activated, the output signal 232 starts oscillating and then eventually settles in its on state, i.e., full optical power of the reflected output optical beam 212. The output signal 232 oscillates because the downward force imparted on the actuator plate 204 by the actuation signal 230 causes the actuator plate 204 to bounce off of the motion stop 208 several times. This bouncing, depicted in FIG. 5, causes the micromirror 202 to move through and within the optical path several times, which switches the output optical beam 212 between the reflection and the transmission states several times creating the oscillating output signal 232. In this example, it takes 11.36 milliseconds (ms) for the output signal 232 to reach 90% settlement. As evidenced by this rather lengthy settlement time, the actuation signal 230 does not provide quick and efficient damping in complex dynamic systems that have motion stops.

It is desirable to minimize the settlement time of the actuator plate 204 in order to reduce the switching time. Such a reduction in the switching time of the MEMS switching cells increases the performance of the optical switch 100. The settlement time of the actuator plate 204 can be reduced by employing a damping method that provides more effective damping than the damping provided by the actuation signal 230.

Figure 6:
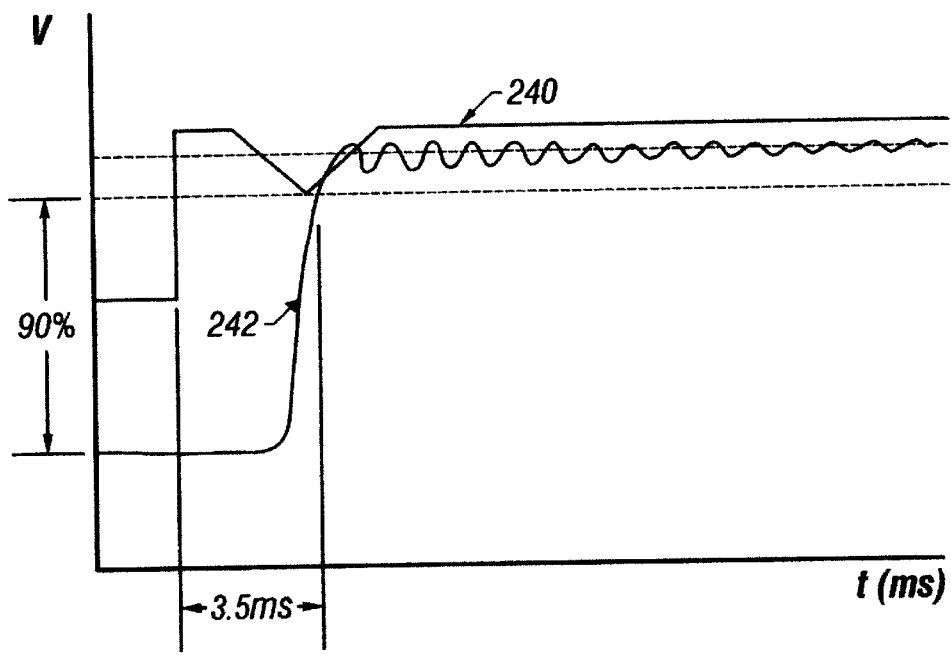
FIG. 6 is a plot illustrating an actuation signal in accordance with an embodiment of the present invention and the resulting output signal when the actuation signal is applied to the MEMS switching cell shown in FIG. 2.

Referring to FIG. 6, there is illustrated an actuation signal 240 in accordance with one embodiment of the present invention. The actuation signal 240 provides highly effective damping of a structure in a complex dynamic system having a positive motion stop. Similar to above, the actuation signal 240 is the signal that is applied between the actuator plate 204 and the actuator electrode 214 to create a force that pulls the actuator plate 204 towards the motion stop 208. The resulting output signal 242 represents the optical power of the output optical beam 212 that is reflected off of the micromirror 202.

As illustrated, shortly after the actuation signal 240 is activated, the output signal 242 rises above 90% of its maximum level and stays there. The oscillations in the output signal 242 are small and do not fall below the 90% level. In this example, it takes only 3.5 ms for the output signal 242 to reach 90% settlement. Thus, the actuation signal 240 provides a greatly reduced settling time as compared to the settling time achieved with the actuation signal 230 of FIG. 4.

The actuation signal 240 provides highly effective damping because it reduces the magnitude of bouncing off of the motion stop 208 and reduces the length of time that the actuator plate 204 bounces off of the motion stop 208. These features reduce the settling time of the actuator plate 204. In this way, the actuation signal 240 provides electronic damping of the actuator plate 204.

Figure 7:
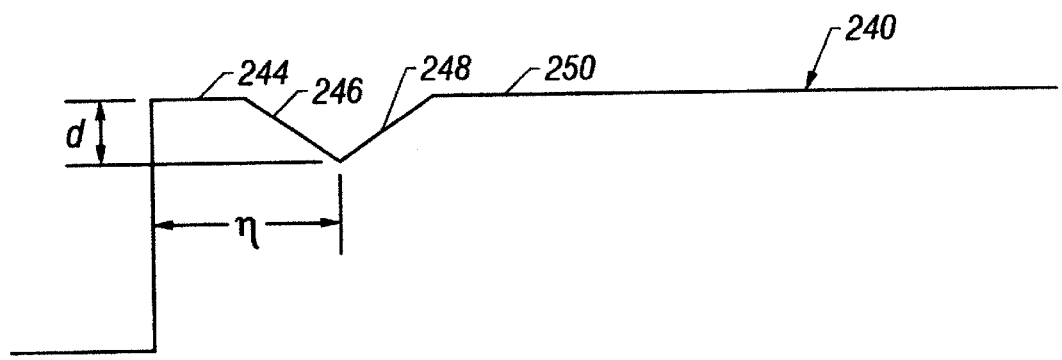
FIG. 7 is a plot further illustrating the actuation signal shown in FIG. 6.

Referring to FIG. 7, the actuation signal waveform 240 provides highly effective and simple to implement electronic damping for the actuator plate 204 (of FIGS. 2 and 3) at the mechanical motion stop 208 (of FIGS. 2 and 3). Important characteristics of the signal 240 are a decrease in drive timed with respect to the first impact of the moving actuator plate 204 on the motion stop 208. Specifically, the actuation signal waveform 240 preferably begins with an acceleration phase 244 during which the actuator plate 204 accelerates towards the motion stop 208. In one embodiment, the acceleration phase 244 involves the application of a substantially constant magnitude voltage between the actuator plate 204 and the actuator electrode 214 (of FIGS. 2 and 3). The acceleration phase 244 is followed by a coast phase 246 where the acceleration of the actuator plate 204 is decreased as it approaches the motion stop 208. The coast phase 246 involves decreasing the magnitude of the actuation voltage in a linear manner prior to the actuator plate 204 impacting the motion stop 208. Next, a segue phase 248 increases the downward force on the actuator plate 204 at about the time the actuator plate 204 impacts the motion stop 208. The segue phase 248 involves increasing the magnitude of the actuation voltage in a linear manner. Finally, a hold down phase 250 applies maximum downward force to the actuator plate 204 to hold it against the motion stop 208. The hold down phase 250 involves leveling off the magnitude of the actuation voltage.

Figure 8B:
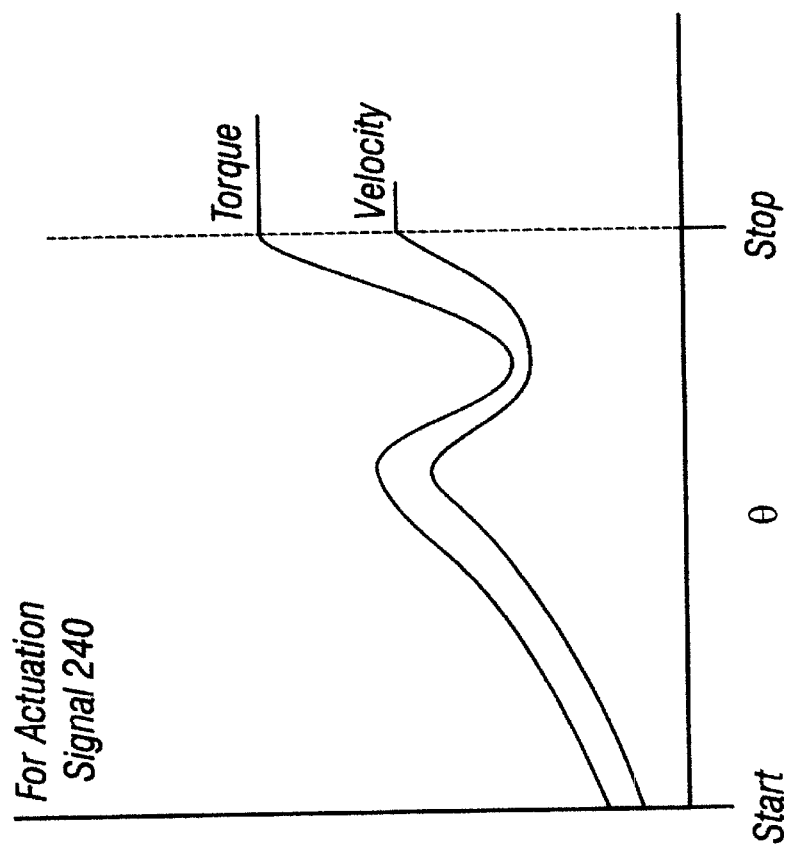
FIG. 8B is a representative plot illustrating the torque and velocity that result from the actuation signal shown in FIG. 6.
Figure 8A:
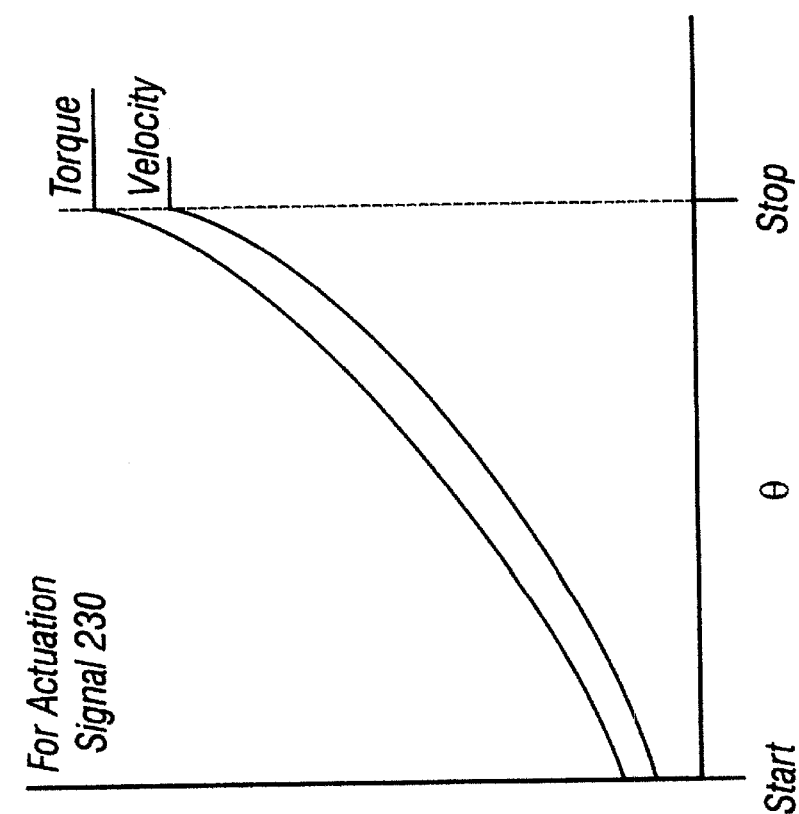
FIG. 8A is a representative plot illustrating the torque and velocity that result from the actuation signal shown in FIG. 4.

FIG. 8A illustrates the torque and velocity of the actuator plate 204 (of FIGS. 2 and 3) resulting from the actuation signal 230 (of FIG. 4), and FIG. 8B illustrates the torque and velocity of the actuator plate 204 resulting from the actuation signal 240 (of FIG. 6). Torque and the actuation signal voltage have the following approximate electrostatic relationship:

$$Torque \propto \frac{Voltage^2}{gap^2} \quad (1)$$

where the "gap" is the distance between the actuator plate 204 and the actuator electrode 214.

With the actuation signal 230, the torque and velocity continue to increase right up to the motion stop 208. This causes severe bouncing of the actuator plate 204. In contrast, with the actuation signal 240, the torque and velocity do not continue to increase right up to the motion stop 208. Instead, the torque and velocity decrease somewhat from the values which signal 230 would cause before reaching the motion stop 208, which reduces the strength of the bounce of the actuator plate 204.

Referring to FIG. 7, important parameters for the actuation signal waveform 240 are: (1) the total time "η" for the acceleration and coast phases 244, 246; and (2) the decrease (or depth) in voltage "d" during the coast phase 246. In one embodiment of the invention, the depth of modulation "d" is chosen to target an approximately 30–50% reduction in drive as the actuator plate 204 touches down on the motion stop 208. By way of example, "d" may be approximately equal to 40–60% of the substantially constant magnitude of the acceleration phase 244. Furthermore, by way of example, the coast phase 246 may involve decreasing the magnitude of the actuation signal from the substantially constant magnitude of the acceleration phase 244 by the value "d" in an amount of time "τ", where "τ" falls in the range of 1 to 3 ms for the illustrated embodiment.

The value of "η" is preferably chosen to approximately target the first peak in the output signal 232 in FIG. 4, thus lowering the drive just as touchdown occurs. This way the "divot" formed by the coast and segue phases 246, 248 hits just as the actuator plate 204 (of FIGS. 2 and 3) touches down upon the motion stop 208 (of FIGS. 2 and 3), which minimizes the force at approximately the time of contact. Thus, the acceleration and coast phases 244, 246 comprise a total amount of time approximately equal to the time it takes the undamped actuator plate 204 to reach the motion stop 208.

Thus, the actuation signal waveform 240 is typically tuned in amplitude or frequency. Namely, the amplitude sets "d" and thus the magnitude of the acceleration and hold down phases 244, 250, and the frequency sets "η" and thus the coast and segue phases 246, 248.

Figure 9A:
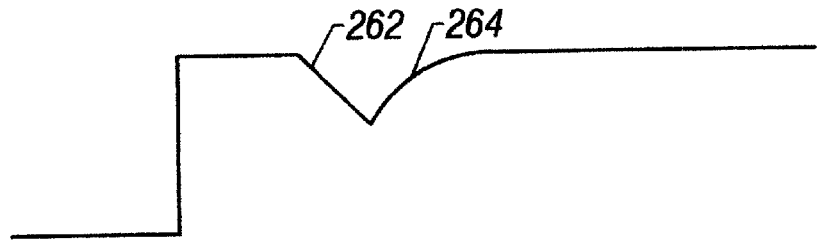
FIGS. 9A, 9B, 9C, 9D, 9E and 9F are plots illustrating actuation signals in accordance with alternative embodiments of the present invention.
Figure 9B:
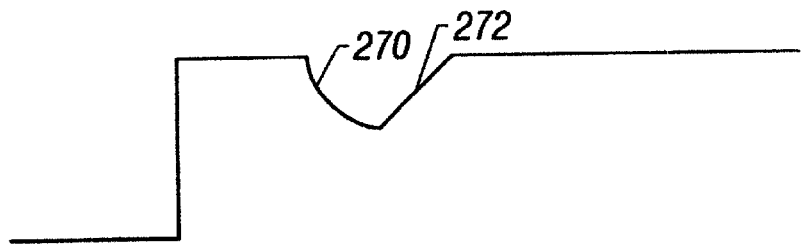

It was mentioned above that the coast and segue phases 246, 248 preferably involve decreasing and increasing, respectively, the magnitude of the actuation signal in a linear manner. It should be well understood, however, that such linear decreasing and increasing is not a requirement of the present invention. Namely, either or both of the coast and segue phases 246, 248 may alternatively be implemented by decreasing and increasing, respectively, the actuation signal in a nonlinear manner in accordance with the present invention. For example, FIG. 9A illustrates a linear coast phase 262 and a nonlinear segue phase 264, and FIG. 9B illustrates a nonlinear coast phase 270 and a linear segue phase 272. Although the linear scheme provides for ease of implementation, a nonlinear scheme may be employed by the present invention.

Figure 9C:
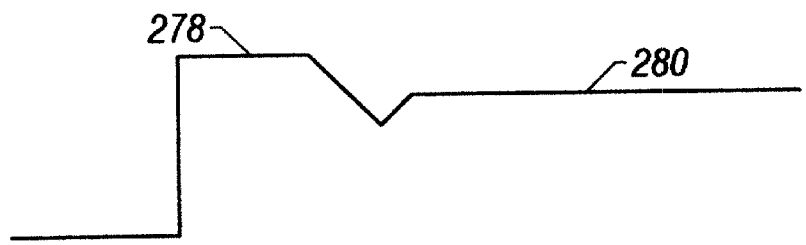
Figure 9D:
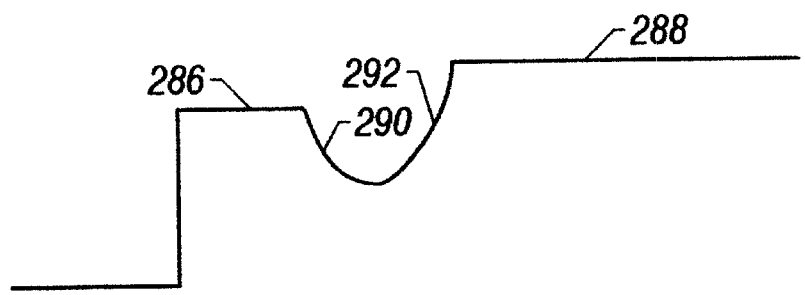

In addition, the acceleration and hold down phases 244, 250 are not required to have the same magnitude. For example, FIG. 9C illustrates the acceleration phase 278 having a greater magnitude than the hold down phase 280, and FIG. 9D illustrates the acceleration phase 286 having a smaller magnitude than the hold down phase 288. Nonlinear coast and segue phases 290, 292 are also shown.

Figure 9E:
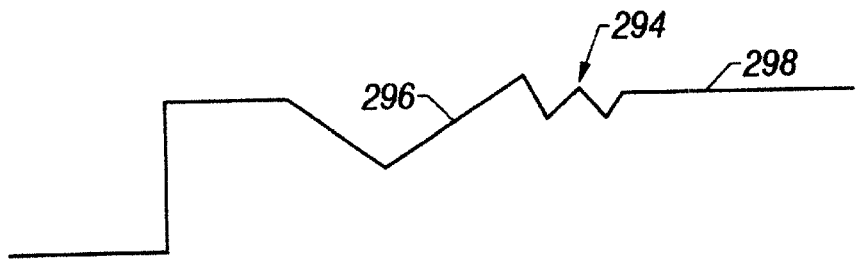

FIG. 9E illustrates that one or more additional fluctuations 294 may be inserted into the actuation signal between the segue phase 296 and the hold down phase 298 in accordance with the present invention.

Figure 9F:
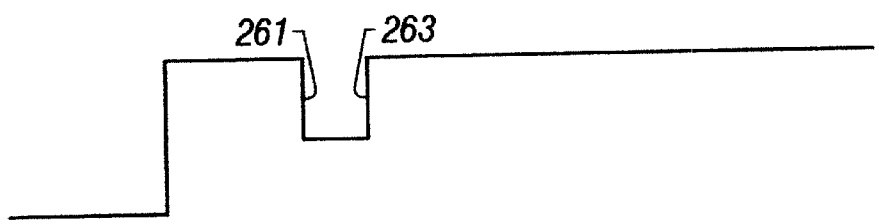

FIG. 9F illustrates that the coast and segue phases 261, 263 may also be implemented as a negative pulse in accordance with the present invention. Namely, the decreased voltage of the coast and segue phases 261, 263 form a pulse, providing in essence a pulsewidth modulated output signal.

Figure 10:
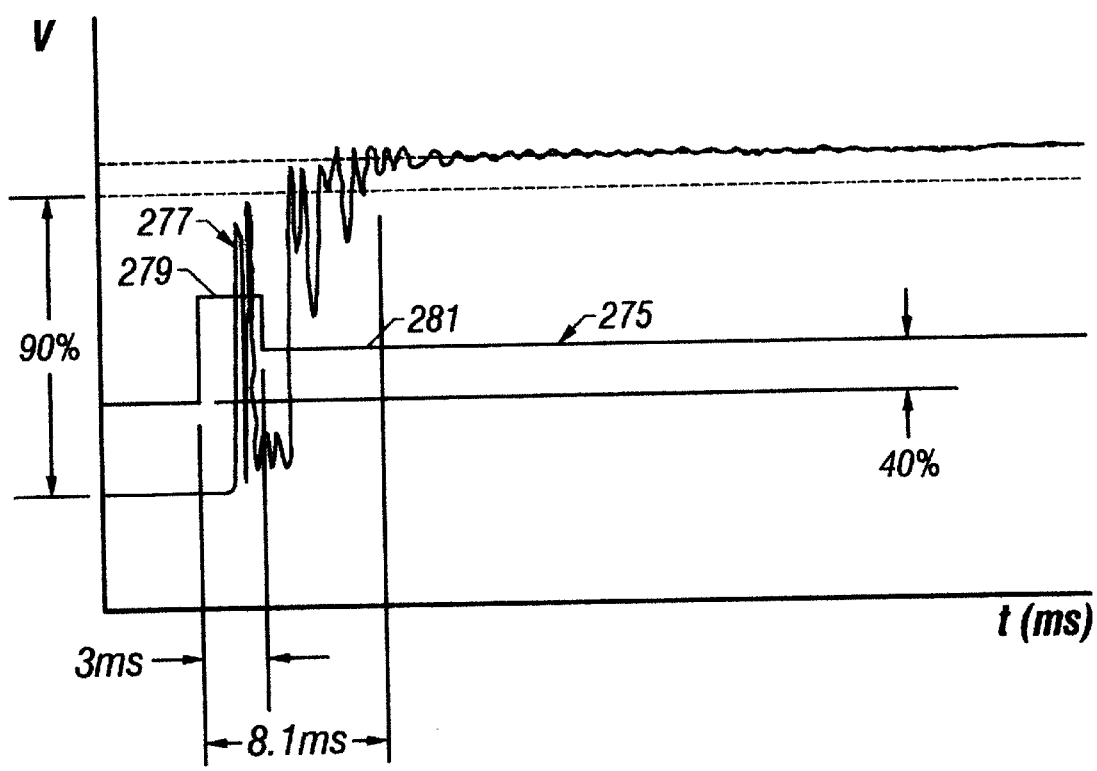
FIG. 10 is a plot illustrating an actuation signal in accordance with another embodiment of the present invention and the resulting output signal when the actuation signal is applied to the MEMS switching cell shown in FIG. 2.

Referring to FIG. 10, there is illustrated an actuation signal 275 in accordance with another embodiment of the present invention. The actuation signal 275 also provides highly effective damping of a structure in a complex dynamic system having a positive motion stop. Similar to above, the actuation signal 275 is applied between the actuator plate 204 (of FIGS. 2 and 3) and the actuator electrode 214 (of FIGS. 2 and 3) to create a force that pulls the actuator plate 204 towards the motion stop 208 (of FIGS. 2 and 3). The resulting output signal 277 represents the optical power of the output optical beam 212 (of FIG. 3) that is reflected off of the micromirror 202 (of FIG. 3).

The actuation signal 275 includes only two phases, namely, an acceleration phase 279 and a hold down phase 281. Because there are only two phases, the actuation signal 275 may be referred to as a "two-step" actuation signal. In the illustrated embodiment, the acceleration phase 279 involves the application of a substantially constant magnitude voltage between the actuator plate 204 and the actuator electrode 214. Following the acceleration phase 279 is the hold down phase 281, which involves the application of a substantially constant magnitude voltage between the actuator plate 204 and the actuator electrode 214 that is smaller than the magnitude applied during the acceleration phase 279.

Figure 11:
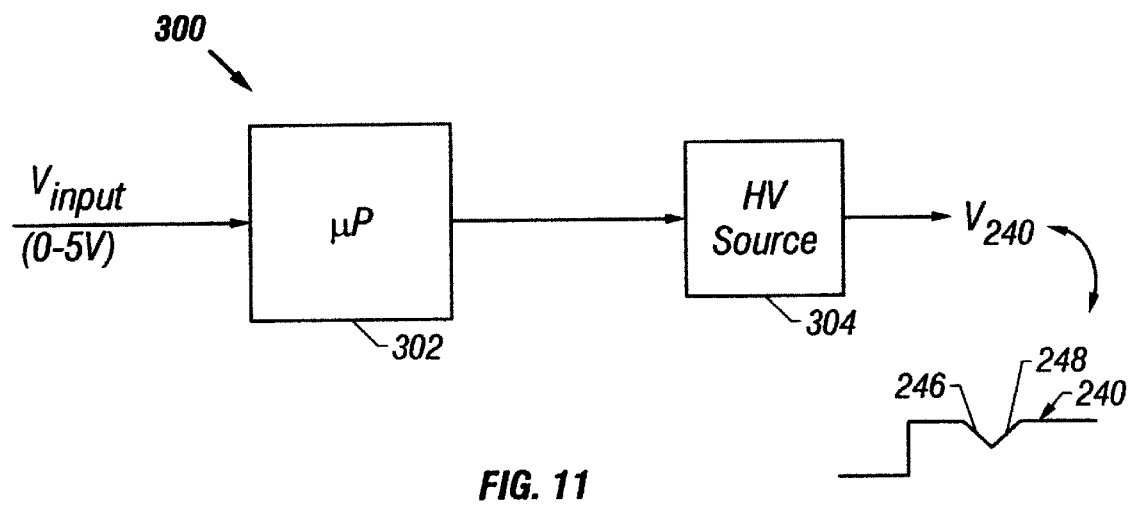
FIG. 11 is a block diagram illustrating an exemplary system for generating the actuation signal shown in FIG. 6 in accordance with one embodiment of the present invention.

As illustrated, shortly after the beginning of the acceleration phase 279, the output signal 277 starts a wide oscillation. This wide oscillation is a result of the actuator plate 204 accelerating toward the motion stop 208 and then bouncing off of it with fairly large magnitude bounces. The hold down phase 281 causes the magnitude of the bounces to decrease and the output signal 277 to eventually settle in its on state, i.e., full optical power of the reflected output optical beam 212. In this example, the acceleration phase 279 continues for 3 ms, and the magnitude of the hold down phase 281 is equal to 40% of the magnitude of the acceleration phase 279. With these values it takes 8.1 ms for the output signal 277 to reach 90% settlement. Thus, the actuation signal 275 provides a reduced settling time as compared to the settling time achieved with the actuation signal 230 of FIG. 4. Referring to FIG. 11, there is illustrated an exemplary high voltage system 300 for generating the actuation signal waveform 240 in accordance with one embodiment of the present invention. An input voltage is received at $V_{input}$. The input voltage is typically a conventional digital signal falling in the range of 0–5 Volts. The actuation signal waveform 240 is output at $V_{240}$.

A microprocessor 302 monitors $V_{input}$. When $V_{input}$ goes high, the microprocessor 302 controls a high voltage source 304 to produce a high voltage at output $V_{240}$. Furthermore, the microprocessor 302 controls the high voltage source 304 to produce the acceleration, coast and segue phases 244, 246, 248 in the output of the high voltage source 304. The "divot" formed by the coast and segue phases 246, 248 is included in the high voltage signal produced at $V_{240}$. The high voltage source 304 can be based on a standard drive voltage that, by way of example, may be equal to the magnitude of the hold down phase 250 of the actuation signal 240.

The above discussion focused on the use of electrostatic attraction to cause the switching process in the switching cell 200 (of FIGS. 2 and 3). Namely, the actuation signal 240 (of FIG. 6) is illustrated as a voltage in the figures. It should be well understood, however, that the actuation signals described herein, i.e., the actuation signal 240 and the actuations signals illustrated in FIGS. 9A, 9B, 9C, 9D, 9E, 9F and 10, may be used with many different types of actuation methods/forces in accordance with the present invention. For example, the actuation signals described herein may be used with electromagnetic attraction, thermal expansion, or piezoelectric attraction. When used with these alternate actuation methods/forces, the actuation signals described herein provide highly effective damping of structures in complex dynamic systems.

Figure 12A:
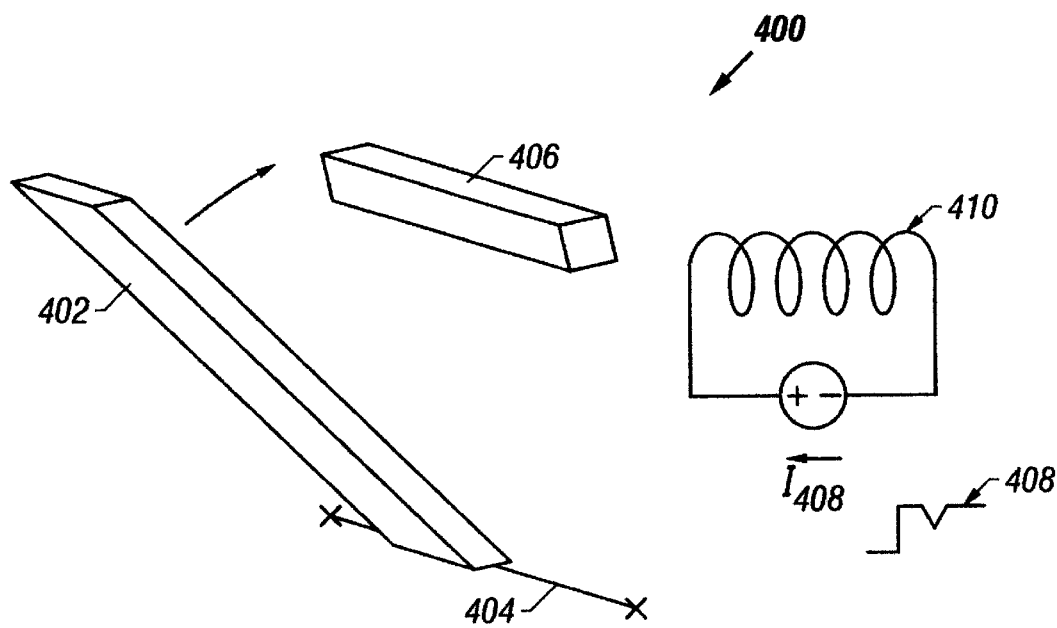
FIGS. 12A and 12B are simplified perspective views illustrating the use of an actuation signal in accordance with another embodiment of the present invention with a complex dynamic system that is actuated using electromagnetic attraction.
Figure 12B:
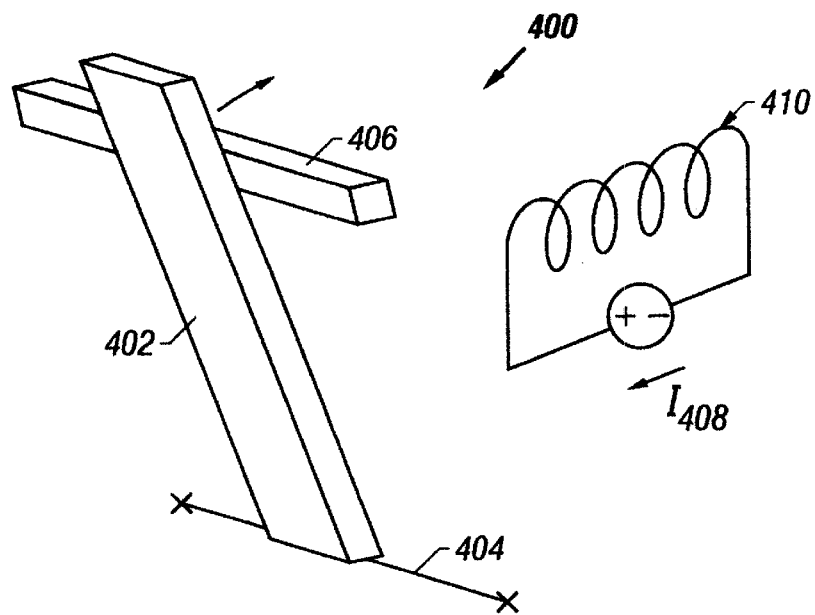

FIGS. 12A and 12B illustrate the manner in which the actuation signals of the present invention can be used to provide highly effective damping in a complex dynamic system 400 that is actuated using electromagnetic attraction. Specifically, the complex dynamic system 400 includes a movable structure 402 that is connected to a hinge 404. The movable structure 402 comprises a ferrous or paramagnetic material and is stopped by a motion stop 406. An actuation signal 408 in accordance with the present invention is applied to an electromagnet 410. In this embodiment, the actuation signal 408 is a current $I_{408}$ that causes the electromagnet 410 to create a force that pulls the moveable structure 402 towards the motion stop 406. The actuation signal 408, which may have the waveform shape of any of the actuation signals described above, provides highly effective damping for the same reasons discussed above. Namely, the actuation signal 408 provides a decrease in drive timed with respect to the first impact of the moveable structure 408 on the motion stop 406.

Figure 13A:
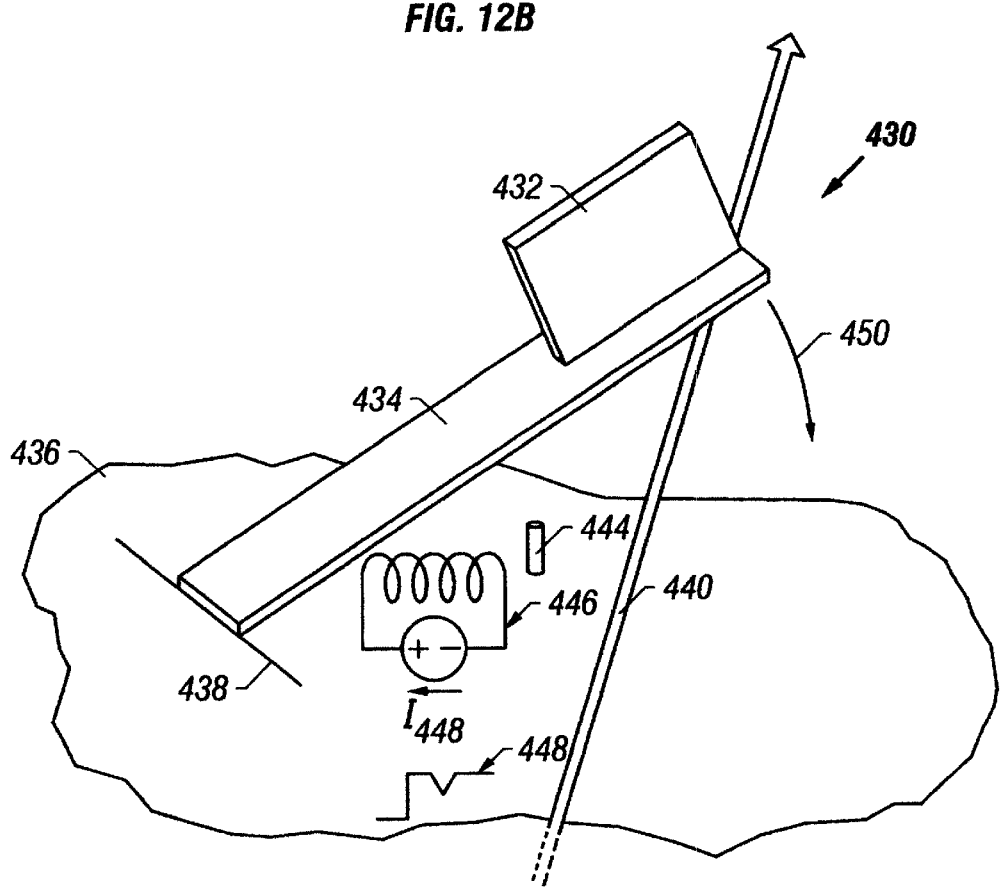
FIGS. 13A and 13B are simplified perspective views illustrating the use of an actuation signal in accordance with another embodiment of the present invention with a MEMS switching cell that is actuated using electromagnetic attraction.
Figure 13B:
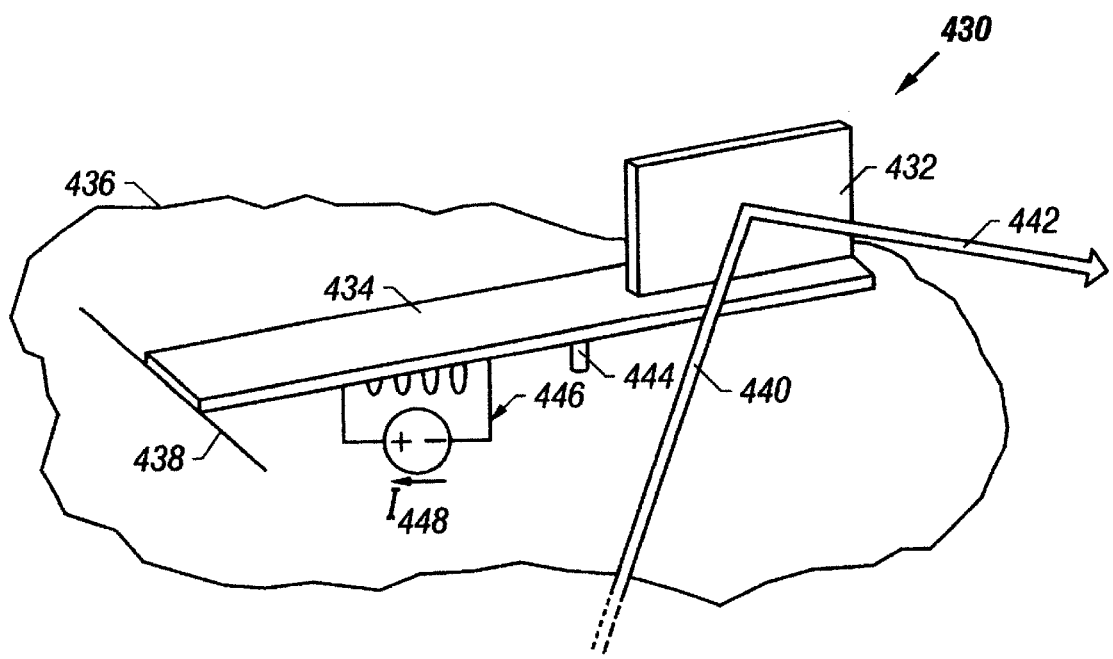

FIGS. 13A and 13B illustrate a MEMS switching cell 430 that is actuated using electromagnetic attraction. A micromirror 432 is mounted to an actuator plate 434. The actuator plate 434 comprises a ferrous or paramagnetic material and is hingedly connected to the substrate 436 with a torsion hinge 438. FIG. 13A illustrates the switching cell 430 in its transmission state where the optical beam 440 is not reflected. FIG. 13B illustrates the switching cell 430 in its reflection state where the optical beam 440 is switched to a reflection direction 442. In the reflection state, the actuator plate 434 rests on a motion stop 444 (or other landing structure) mounted on the substrate 436.

The actuator plate 434, an electromagnet 446 mounted on the substrate 436, and the gap therebetween form an electromagnetic actuator. The switching cell 430 is activated by providing an actuation signal 448 to the electromagnet 446. In this embodiment, the actuation signal 448 is a current $I_{448}$. The current $I_{448}$ causes the electromagnet 446 to create a force that causes the actuator plate 434 and the micromirror 432 mounted thereto to pivot in angular position relative to the substrate 436, i.e., in the direction indicated by arrow 450. This force causes the actuator plate 434 to draw close and contact the motion stop 444. Thus, by applying the actuation signal 448 to the electromagnet 446, the switching process is effectuated by electromagnetic attraction.

In accordance with the present invention, the actuation signal 448 may comprise the waveform shape of any of the actuation signals described above, i.e., the actuation signal 240 and the actuation signals illustrated in FIGS. 9A, 9B, 9C, 9D, 9E, 9F and 10. The use of such waveform shapes for the current $I_{448}$ provides highly effective damping of the actuator plate 434. Highly effective damping is achieved because the current $I_{448}$ provides a decrease in drive timed with respect to the first impact of the actuator plate 434 on the motion stop 444.

The entire contents of U.S. patent application Ser. No. 09/063,644, filed Apr. 20, 1998, entitled "Micromachined Optomechanical Switches", and U.S. patent application Ser. No. 09/483,276, filed Jan. 13, 2000, entitled "Micromachined Optomechanical Switching Cell with Parallel Plate Actuator and On-Chip Power Monitoring", are hereby expressly incorporated by reference into the present application as if fully set forth herein.

Figure 14:
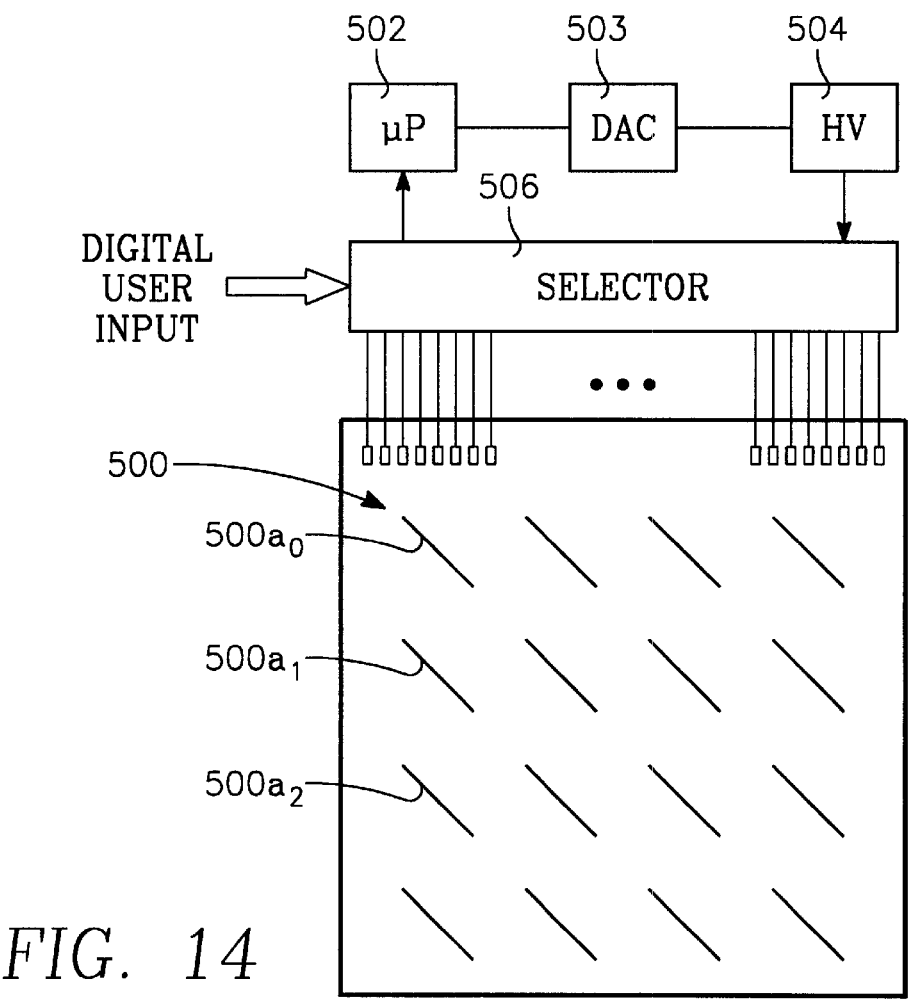
FIG. 14 is a block diagram illustrating an exemplary system for constructing and supplying the actuation signal to a MEMS array in accordance with an embodiment of the present invention.

Turning to FIG. 14, as discovered by the present inventors, controlling system damping can be further complicated in a MEMS array 500. This is because each of the switches $500a_0$, $500a_1$, $500a_2$, etc., in the array 500 can have different damping characteristics. This may be due to device non-uniformities, which can result from the fabrication process. For example, switches near the periphery of the array may have different damping characteristics than switches near a central portion of the array. Such a situation further adds to the complexity of providing effective damping for the system.

Shown in FIG. 14, a single high voltage source 504 may be utilized to provide actuation signals to all of the switches $500a_0$, $500a_1$, $500a_2$, etc., in the array 500. In such a system, a single actuation signal can be selected to take into account damping non-uniformities occurring in the switch array 500.

To determine a single actuation signal for operating the array, an actuation signal having a decreased drive portion is selected as discussed above with reference to FIGS. 6, 7, and 9A–9F. In the implementation of FIG. 14, during operation of the switch array 500, the high voltage source 504 is applied not only to a selected switch for switching, as well as to any and all switches already energized. Thus, in this example, the actuation signal should be selected so as to inhibit already energized switches from moving, or otherwise changing their switch state. Hence, in the MEMS optical switch example discussed above with reference to FIG. 5, the depth of modulation "d" is chosen to reduce the drive of the actuator plate or actuator arm 204, but not to allow release of any energized switches in the array 500.

Figure 15:
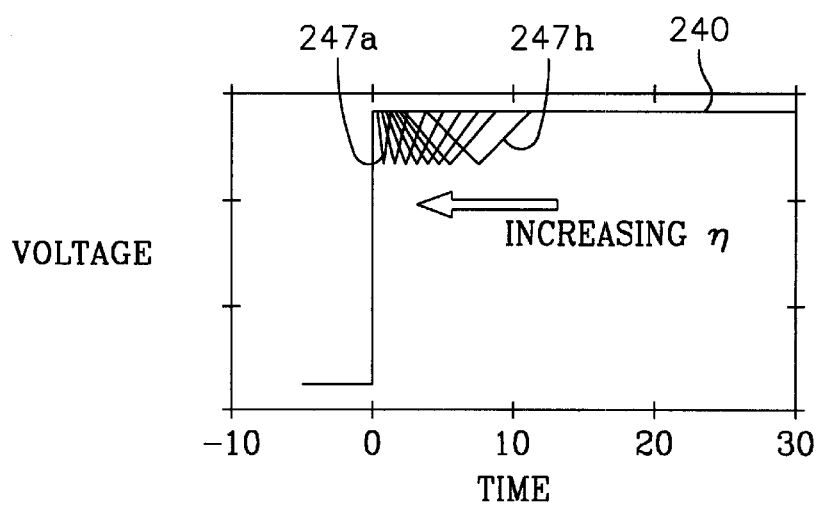
FIG. 15 is a plot illustrating the effects of varying the offset and duration of the divot in the actuation signal of FIG. 6.

Turning to FIG. 15, the selected actuation signal 240 is applied to each of the switches of the array 500 to determine a range of values of a damping coefficient z for each switch that provide settling times in conformance with a predetermined specification. The damping coefficient z sets the time η (shown in FIG. 7). In addition, the damping coefficient z is used to define the relationship between an offset of the coast phase 246 with respect to beginning of the acceleration phase 244, and the combined duration of the coast and seque phases 246 and 248 (both shown in FIG. 7). Thus, the damping coefficient z can be utilized to proportionally vary the offset and the combined duration as illustrated in FIG. 15. Increasing the damping coefficient z decreases the time η (shown in FIG. 7). FIG. 15 depicts how the damping coefficient z can be used to proportionally change the offset and duration of the coast and seque phases (shown as divots 247a–h) of the selected actuation signal 240 of FIG. 7. In FIG. 15, multiple divots 247a–h are shown in the selected actuation signal 240 in response to multiple selected damping coefficients z. Thus, In this way, a range of values for the damping coefficients z of the selected waveform can be expediently determined for each of the switches in the array 500.

Figure 16:
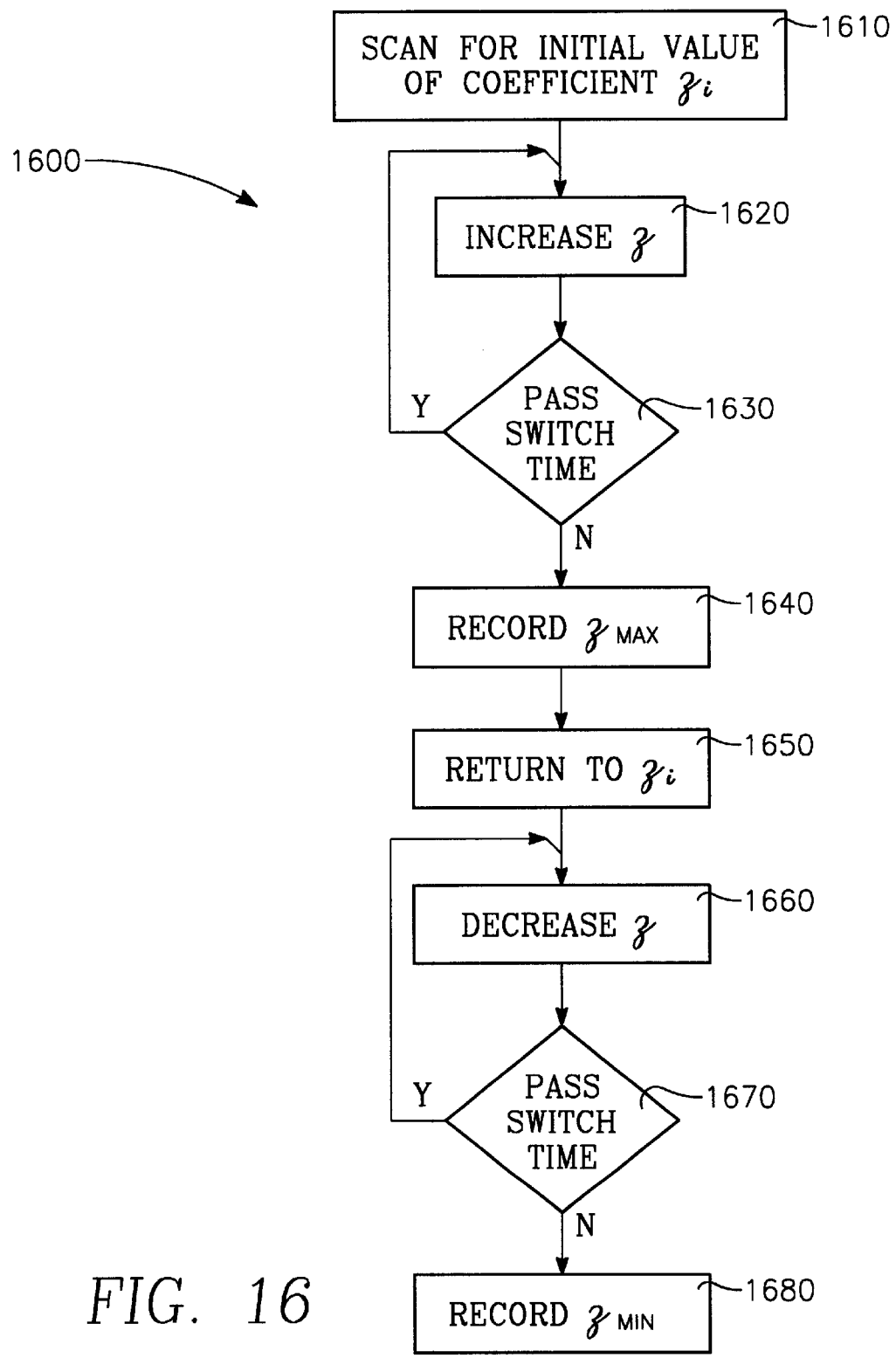
FIG. 16 illustrates a method for determining a damping characteristic for each of the switches in an array in accordance with an implementation of the present invention.

Turning to FIG. 16, in one implementation for example, an initial value for the damping coefficient $z_i$ can be determined by using a test station to scan for an initial value of the damping coefficient $z_i$ that provides a settling time in conformance with a predetermined specification as illustrated at box 1610. The damping coefficient z may then be successively increased from its initial value $z_i$ to determine a maximum value of the damping coefficient $z_{max}$ that produces a settling time in conformance with the predetermined specification, illustrated in boxes 1620 and 1630. The maximum damping coefficient $z_{man}$ is then recorded 1640. The minimum value of the damping coefficient $z_{min}$ is determined, such as by returning to the initial damping coefficient $z_i$ and successively decreasing the damping coefficient z to ascertain settling times in conformance with the predetermined specification, illustrated by boxes 1650, 1660, and 1670. The minimum damping coefficient $z_{min}$ is recorded 1680.

Typically, this is carried out at an ambient pressure similar to the device operating conditions. As such, it can be carried out after hermetically sealing of the package containing the MEMS chip.

Referring to FIG. 14, the ranges of values that produce settling times in conformance with the predetermined specification for each of the switches in the array 500 are used to select an operating damping coefficient $z_{oper}$ to be utilized by the microprocessor 502 to control the high voltage source 504. In one implementation, the operating damping coefficient $z_{oper}$ is selected midway between, the largest value of the minimum damping coefficient $z_{min}$ for all the switches in the array, and the smallest value of the maximum damping coefficient $z_{max}$ for all the switches in the array 500.

The microprocessor 502 is programmed to construct a single operating actuation signal having the values of the offset and combined duration corresponding to the operating damping coefficient $z_{oper}$. To construct the operating actuation signal, the microprocessor 502 monitors for commencement of an actuation signal to a switch, such as by monitoring the incoming digital user input supplied to the selector 506. After commencement of an actuation signal has been detected by the microprocessor 502, the microprocessor controls the high voltage signal source 504 to provide a divot, or other selected signal reduction at its output. As discussed above, in the implementation of FIG. 14, the divot or other selected signal reduction is supplied not only to the structure being moved but also to any switches currently energized or otherwise receiving a signal from the high voltage source 504.

It is also possible to construct a custom operating actuation signal for each switch using the determined settling characteristics for each switch. This may be accomplished by using the stored values of the minimum and maximum damping coefficients $z_{min}$ and $z_{max}$ for each switch. Or, a custom damping coefficient $z_{cust}$ that provides the best measured settling time for each switch could be stored and utilized by the microprocessor 502 to construct a custom operating actuation signal for each switch. The custom values may be stored in a look-up table format that is accessed by the microprocessor 602 for selecting the corresponding stored custom damping coefficient for each switch. An individual damping coefficient could be stored in the look-up table with reference to the switch's position in the array, i.e. by column and row. The custom values in the look-up table, which can be the corresponding offset and combined duration, can be utilized to construct a custom operating actuation signal for each switch.

Figure 17:
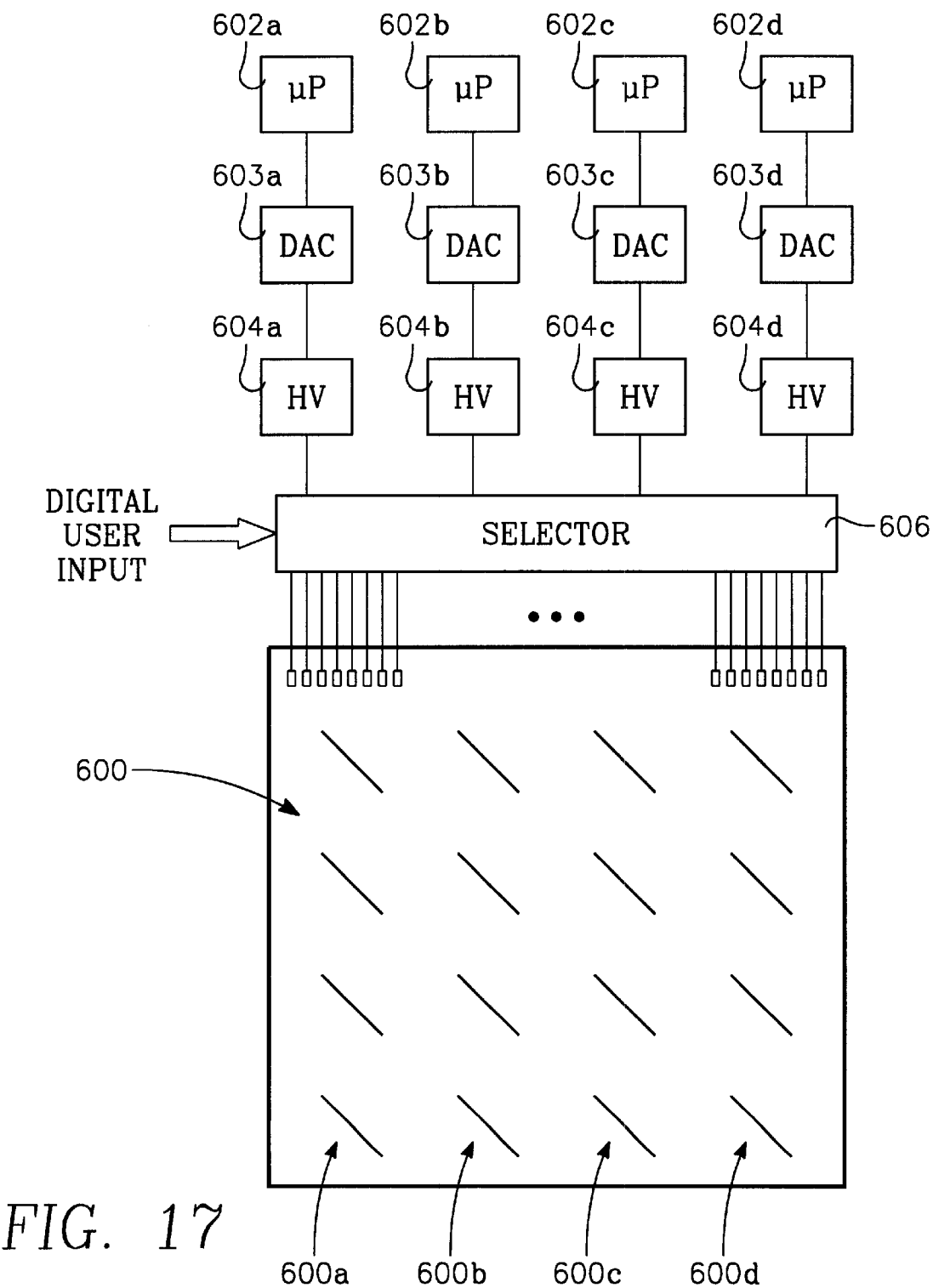
FIG. 17 is a block diagram illustrating an exemplary system for constructing and supplying the actuation signal to a MEMS array in accordance with an embodiment of the present invention.

Turning to FIG. 17, it is also possible to employ several high voltage sources 604a–d to provide actuation signals to the switches of the array 600. In the implementation of FIG. 17, one high voltage source 604a provides actuation signals for a column 600a of switches 600$a_0$–$a_3$. This allows switches in the different columns 600a–d to be switched contemporaneously and/or near contemporaneously without having to wait for a single shared high voltage source 502 to return to an acceleration phase voltage. For example, a switch may be actuated before the divot 246, 248, shown in FIG. 7, which is being applied to a switch in another column has finished.

Further, because obtaining values from a large look-up table can be microprocessor intensive, utilizing several microprocessors 604a–d allows for smaller look-up tables be used in implementing the custom operating actuation signals. For example, one look-up table associated with processor 602a stores the values for the switches in column 600a, and another look-up table associated with processor 602b stores the values for the switches in column 600b, and so on. This can reduce costs by allowing slower less expensive microprocessors to be used. Multiple processors also facilitates contemporaneous and/or near contemporaneous switching of switches in the different columns.

It is possible to provide separate microprocessor controlled high voltage sources for each of the switches in the array 600. In a conventional optical cross-connect, however, no more that one switch in a column is switched at a time. Thus, for the 4×4 array 600, four high voltage sources are sufficient. Further, as array sizes grow to 8×8, 16×16, and beyond, providing a microprocessor, a DAC, and a high voltage supply for each column ultimately will be more practical than providing a microprocessor, a DAC, and a high voltage supply for each switch.

Figure 18:
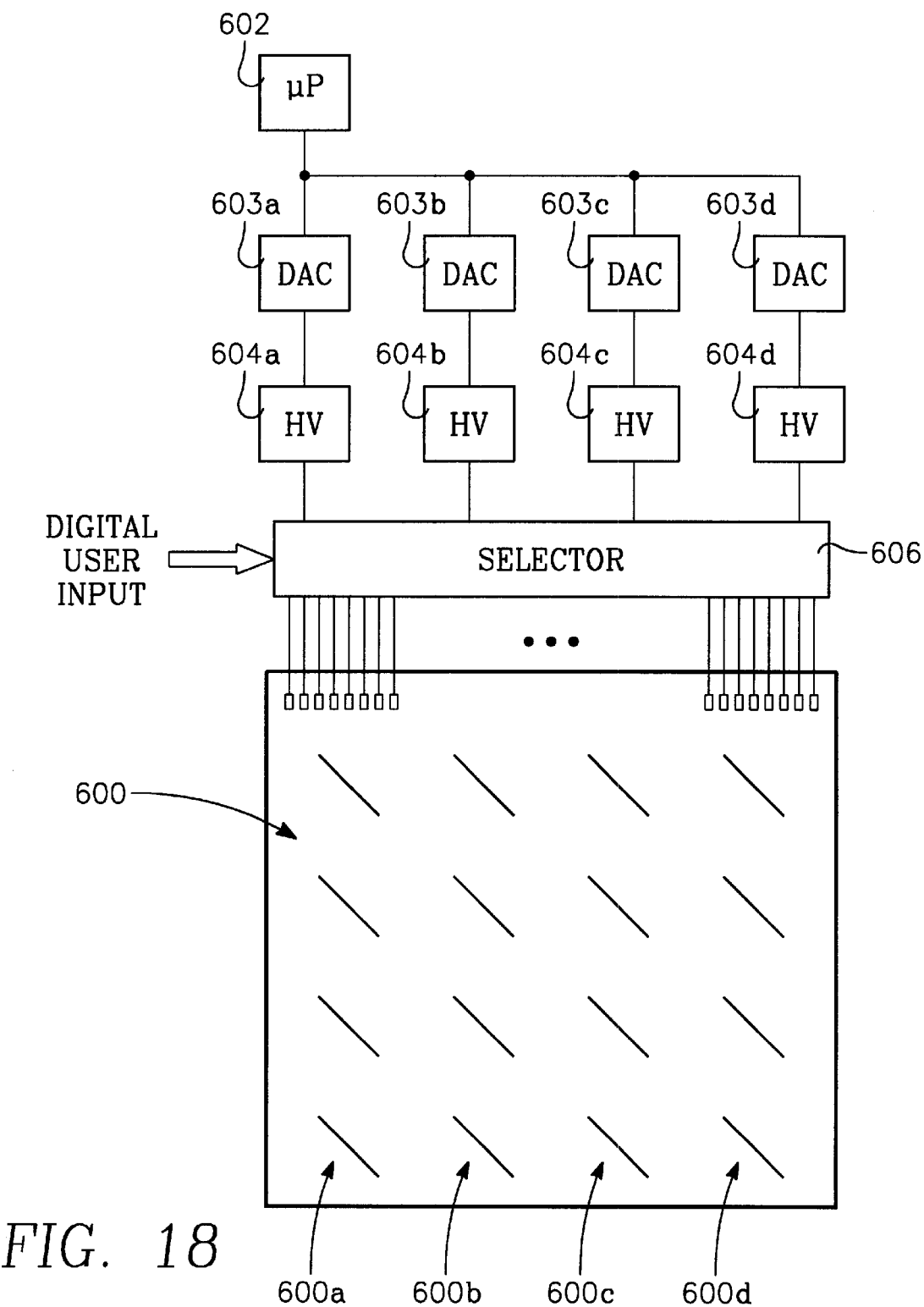
FIG. 18 is a block diagram illustrating an exemplary system for constructing and supplying the actuation signal to a MEMS array in accordance with an embodiment of the present invention.

Turning to FIG. 18, a single microprocessor 602 may be utilized to construct custom operating actuation signals using multiple high voltage sources 604a–d. As discussed above, a single microprocessor requires a larger look-up table, and therefore typically would require a higher performance microprocessor than with the multiple processor implementation of FIG. 17.

Referring to FIGS. 14, 17 and 18, although shown as a single block, the selector 506, 606 may be a single component, or it may comprise, or equivalently be, several individual selectors. Thus, a selector 506 or 606 may be a selector that is a single or multiple component device.

Constructing a custom actuation signal for each switch allows better settling time for the switches in the array. The custom actuation signal has been discovered by the present inventors to provide about 50% better settling times.

Although in some implementations discussed above the offset of the coast phase with respect to the commencement of the acceleration phase and the combined duration of the coast phase and the seque phase can be varied proportionally, it is also possible to independently vary the offset and/or the combined duration. Further, it is possible to vary one of the waveforms controlling parameters, such as the offset, the combined duration, or the independent durations of the coast or seque phases while an other is held constant.

While the invention herein disclosed has been described by the specific embodiments and applications thereof, numerous modifications and variations could be made thereto by those skilled in the art without departing from the scope of the invention set forth in the claims.

What is claimed is:

1. A method for operating a plurality of MEMS devices comprising:
   a) applying a magnitude of a selected actuation signal equal to a first substantially constant magnitude to an actuator to cause a movable structure to begin to accelerate from a first position to impact a motion stop at a second position;

b) decreasing the magnitude of the selected actuation signal in a first manner;

c) varying at least one of a start time and a duration of the decreasing magnitude of the selected actuation signal;

d) observing a settling time of the movable structure in response to the step of varying;

e) ascertaining a range of values for the start times and the corresponding durations for each of the plurality of MEMS devices capable of providing settling times of the movable structure in conformance with a predetermined specification based on the steps of varying and observing;

f) using the ascertained range of values for each of the plurality of MEMS devices and the selected actuation signal, determining an operating start time and a corresponding operating duration to construct an operating actuation signal capable of providing a settling time for each of the plurality of MEMS devices in conformance with the predetermined specification; and g) controlling a signal source with a programmed processor to selectively apply the operating actuation signal to the plurality of MEMS devices.

2. The method of claim 1 wherein controlling the signal source further comprises applying the signal source output signal to all of the plurality of MEMS devices receiving an actuation signal.

3. The method of claim 1 wherein controlling the signal source with the processor comprises decreasing a magnitude of an output of the signal source using the operating start time and the corresponding operating duration.

4. The method of claim 3 wherein controlling the signal source comprises generating a divot in the output of the signal source.

5. The method of claim 1 wherein controlling the signal source with the preprogrammed processor comprises applying the decreasing magnitude portion with the determined operating start time and corresponding operating duration to all of the plurality of MEMS devices energized by the processor.

6. The method of claim 1 wherein observing comprises storing values of start times and corresponding durations in conformance with the predetermined specification.

7. The method of claim 6 wherein determining comprises:

a) determining a start time substantially representing an average between: a maximum start time for the plurality of MEMS devices producing a value of the settling time of the movable structure in conformance with a predetermined specification, and a minimum start time for the plurality of MEMS devices producing a value of the settling time of the movable structure in conformance with the predetermined specification; and b) determining a corresponding duration substantially representing an average between: a maximum corresponding duration for the plurality of MEMS devices producing a value of the settling time of the movable structure in conformance with a predetermined specification, and a minimum corresponding duration for the plurality of MEMS devices producing a value of the settling time of the movable structure in conformance with the predetermined specification.

8. The method of claim 1 wherein decreasing the magnitude of the actuation signal in a first manner comprises decreasing the magnitude of the actuation signal in a linear manner.

9. The method of claim 1 further comprising increasing the magnitude of the operating actuation signal in a second manner subsequent to decreasing the magnitude.

10. The method of claim 9 further comprising leveling off the magnitude of the operating actuation signal at a second substantially constant magnitude subsequent to increasing the magnitude.

11. The method of claim 9 further comprising leveling off the magnitude of the operating actuation signal at the first substantially constant magnitude subsequent to increasing the magnitude.

12. The method of claim 9 wherein increasing the magnitude of the actuation signal in a second manner comprises increasing the magnitude of the actuation signal in a linear manner.

13. The method of claim 12 wherein decreasing the magnitude of the actuation signal in a first manner comprises decreasing the magnitude of the actuation signal in a linear manner.

14. The method of claim 9 comprising at least one of: (a) decreasing the magnitude of the actuation signal in a non-linear manner, or (b) increasing the magnitude of the actuation signal in a nonlinear manner.

15. The method of claim 1 further comprising applying an actuation voltage between an actuator arm pivotally coupled to a substrate and an electrode located below the second position and adjacent the substrate.

16. The method of claim 1 further comprising actuating a mirror structure transversely mounted to the actuator arm to switch optical signal.

17. A method for determining and implementing electrical damping coefficients for a plurality of MEMS devices, the method comprising:

a) constructing and supplying a plurality of actuation signals to each of the plurality of MEMS devices;

b) wherein constructing and supplying comprises causing a movable structure to begin to accelerate from a first position towards a second position and to impact a motion stop;

c) wherein constructing and supplying each of the plurality of actuation signals comprises:

(i) providing the actuation signal with a first portion of a substantially constant magnitude;

(ii) providing the actuation signal with a portion decreasing to a second magnitude following the first portion;

(iii) providing the actuation signal with a portion increasing from the second magnitude subsequent to decreasing to the second magnitude;

(iv) providing the second magnitude offset from a commencement of the first portion;

(v) providing the decreasing portion and the increasing portion with a combined duration; and (vi) ascertaining a range of values for the offset of the second magnitude and the corresponding combined duration for each of the plurality of MEMS devices that provide settling times of the movable structure in conformance with the predetermined specification; and d) programming a processor to construct a single operating actuation signal for the plurality of MEMS devices capable of causing the movable structure to begin to accelerate from the first position towards the second position and to impact the motion stop so as to provide settling times for the movable structure for each of the plurality of MEMS devices in conformance with the predetermined specification using the ascertained range of values for each of the plurality of MEMS devices.

18. The method of claim 17 wherein ascertaining comprises varying the second magnitude offset and the combined duration proportionally.

19. The method of claim 18 comprising programming the processor control a signal source so as to substantially provide the first substantially constant magnitude portion, the decreasing portion, and the increasing portion at an output of the signal source.

20. The method of claim 19 comprising programming the processor to control the signal source so as to generate a divot in the output of the signal source.

21. The method of claim 20 wherein constructing and supplying comprises providing the actuation signal with a second portion of the substantially constant magnitude after providing the increasing portion.

22. The method of claim 21 wherein providing the actuation signal with the decreasing portion comprises providing a linearly decreasing portion, and wherein providing the actuation signal with the increasing portion comprises providing a linearly increasing portion.

23. The method of claim 17 comprising programming the processor control a signal source so as to substantially provide the first substantially constant magnitude portion, the decreasing portion, and the increasing portion at an output of the signal source.

24. The method of claim 17 comprising providing the second magnitude offset and the combined duration with substantially a same duration.

25. The method of claim 24 wherein ascertaining comprises varying the second magnitude offset and the combined duration simultaneously.

26. The method of claim 17 comprising:
   a) wherein constructing and supplying comprises providing the actuation signal with a second portion of the substantially constant magnitude after providing the increasing portion;
   b) wherein providing the actuation signal with decreasing portion comprises providing a linearly decreasing portion; and
   c) wherein providing the actuation signal with increasing portion comprises providing a linearly increasing portion.

27. The method of claim 17 wherein ascertaining the range of values for each of the plurality of MEMS devices comprises:
   a) selecting initial values for the offset of the second magnitude and for a corresponding combined duration to provide a settling time in conformance with a predetermined specification;
   b) increasing the offset of the second magnitude and the corresponding combined duration from the initial values; and
   c) decreasing the offset of the second magnitude and the corresponding combined duration from the initial values.

28. The method of claim 27 wherein ascertaining the range of values for each of the plurality of MEMS devices comprises:
   a) determining maximum values for the offset of the second magnitude and the corresponding combined duration in conformance with the predetermined specification for each of the plurality of MEMS devices; and
   b) determining minimum values for the offset of the second magnitude and the corresponding combined duration in conformance with the predetermined specification for each of the plurality of MEMS devices.

29. The method of claim 28 wherein ascertaining the range of values for each of the plurality of MEMS devices comprises:
   a) selecting a minimum value of the maximum determined values for the offset of the second magnitude and the corresponding combined duration in conformance with the predetermined specification for each of the plurality of MEMS devices;
   b) selecting a maximum value of the minimum determined values for the offset of the second magnitude and the corresponding combined duration in conformance with the predetermined specification for each of the plurality of MEMS devices; and
   c) selecting an operating offset value and corresponding operating duration for the operating actuation signal between the selected minimum and maximum values.

30. The method of claim 29 wherein selecting an operating offset value and corresponding operating duration for the operating actuation signal midway between the selected minimum and maximum values.

31. The method of claim 17 wherein programming comprises programming the processor to control the signal source to generate a divot in the output of the signal source.

32. A method for operating a plurality of MEMS devices comprising:
   a) generating an actuation signal for actuating a first structure;
   b) actuating the first structure to impact a second structure using the actuation signal;
   c) wherein generating the actuation signal comprises providing a drive phase and a coast phase;
   d) adjusting at least one of a start time and a duration of the coast phase;
   e) determining a range of values for each of the plurality of MEMS switches of the start times and corresponding durations that provide settling times of the first structure in conformance with a predetermined specification;
   f) selecting an operating start time and a corresponding operating duration of the coast phase using the range of values; and
   g) programming a processor to operate the plurality of MEMS switches using an operating actuation signal comprising the selected operating start time and corresponding operating duration for the coast phase.

33. The method of claim 32 wherein selecting an operating start time and corresponding operating duration of the coast phase using the range of values for the plurality of MEMS devices further comprises:
   a) determining a start time and a corresponding operating duration representing a minimum settling time within the range of values;
   b) determining a start time and a corresponding operating duration representing a maximum settling time within the range of values; and
   c) selecting the operating start time and an operating duration of the coast phase for the plurality of switches using the maximum and minimum settling time values.

34. The method of claim 32 wherein the coast phase is provided prior to impact between the first and second structures.

35. The method of claim 34 wherein the coast phase is provided prior to a first impact between the first and second structures.

36. The method of claim 32 wherein determining whether a settling time of the selected MEMS device conforms to a predetermined specification comprises measuring an optical signal associated with a selected switch.

37. The method of claim 32 wherein adjusting at least one of a start time and a duration of the coast phase comprises simultaneously varying the start time and the duration of the coast phase.

38. The method of claim 32 wherein determining a range of values for each of the plurality of MEMS devices comprises:
   (i) measuring optical signals reflected by each of the plurality of MEMS devices in response to a plurality of the generated actuation signals;
   (ii) storing the minimum and maximum values of time to switch the optical signal within a predetermined criteria so as to determine the settling time for each of the plurality of switches;
   (iii) selecting a maximum settling time value from the stored minimum values of time;
   (iv) selecting a minimum settling time value from the stored maximum values of time; and
   (v) selecting the operating start time and the corresponding operating duration of the coast phase for the plurality of switches using the maximum and minimum settling time values.

39. The method of claim 38 further comprising proportionally varying the start time and the corresponding duration of the coast phase.

40. A method for determining and implementing electrical damping coefficients for a plurality of MEMS optical switches, the method comprising:
   a) selecting an actuation signal for causing an actuator arm having a mirror mounted thereon to pivot from a first position towards a second position to impact a motion stop comprising:
      (i) providing an acceleration phase at a first substantially constant magnitude;
      (ii) providing a coast phase decreasing from the first magnitude to a second magnitude;
      (iii) providing a segue phase increasing in magnitude following the coast phase;
      (iv) wherein the actuation signal is constructed such that the second magnitude has an offset from a start of the acceleration phase; and
      (v) wherein the actuation signal is constructed such that the coast phase and the segue phase have a combined duration;
   b) generating and supplying a plurality of the selected actuation signal to each of the plurality of MEMS switches;
   c) ascertaining a range of values of the offset and the duration of the selected actuation signal for each of the plurality of MEMS devices that provides a settling time of the movable structure with respect to the motion stop that are in conformance with a predetermined specification, wherein ascertaining comprises:
      (i) adjusting a frequency associated with the selected actuation signal so as to proportionally adjust the offset and the combined duration;
      (ii) scanning to determine an initial value of a frequency of the selected actuation signal that produces a settling time in conformance with the predetermined specification;
      (iii) increasing the frequency to ascertain a maximum frequency that produces a settling time in conformance with the predetermined specification; and
      (iv) decreasing the frequency to ascertain a minimum frequency that produces a settling time in conformance with the predetermined specification;
   d) selecting a single frequency from the range of values for each of the MEMS switches that provides settling times for each of the plurality of MEMS switches in conformance with the predetermined specification using the ascertained range of values for each of the plurality of MEMS switches; and
   e) programming a processor to operate the plurality of MEMS switches with the selected actuation signal at the selected single frequency.

41. The method of claim 40 wherein programming the processor comprises programming the processor to control a signal source to provide the selected actuation signal at the selected single frequency to all energized switches of the plurality of MEMS switches.

42. The method of claim 41 wherein ascertaining the range of values further comprises detecting an optical signal reflected from the mirror to ascertain whether the adjusted frequency produces a settling time in conformance with the predetermined specification.

43. The method of claim 42 wherein providing the segue phase comprises increasing from the second magnitude to the first magnitude.

44. The method of claim 43 wherein providing the coast phase comprises linearly decreasing from the first magnitude, and wherein providing the segue phase comprises linearly increasing from the second magnitude.

45. The method of claim 44 wherein selecting a single frequency comprises selecting a frequency midway between a largest value of the minimum ascertained frequencies for the plurality of MEMS switches and a smallest value of the maximum ascertained frequencies for the plurality of MEMS switches.

46. A method for determining and implementing electrical damping coefficients for a plurality of MEMS devices, the method comprising:
   a) selecting an actuation signal comprising a portion for damping an impact between a first and a second MEMS structure;
   b) applying the actuation signal to each of the plurality of MEMS devices comprising:
      (i) applying the selected signal to actuate the first structure to impact the second structure;
      (ii) varying a damping coefficient of the selected signal; and
      (iii) observing a settling time of the first structure in response to varied damping coefficients;
   c) selecting a damping coefficient based on the step of observing settling times of each of the plurality of MEMS devices;
   d) programming a processor to control an operating actuation signal for actuating the first structure during operation of the plurality of MEMS devices; and
   e) wherein programming comprises programming the processor such that the operating actuation signal comprises the selected actuation signal having the selected damping coefficient.

47. The method of claim 46 wherein programming comprises programming the processor to reduce an output of a signal source after commencement of actuation of the first structure to impact the second structure.

48. The method of claim 46 wherein programming comprises programming the processor to construct a single operating actuation signal for the plurality of MEMS devices.

49. The method of claim 48 wherein observing comprises:
   a) determining a minimum damping coefficient to provide a settling time of the first structure in conformance with a predetermined specification; and b) determining a maximum damping coefficient to provide a settling time of the first structure in conformance with a predetermined specification.

50. The method of claim 49 wherein selecting a damping coefficient comprises selecting a damping coefficient midway between a largest minimum damping coefficient for the plurality of devices and a smallest maximum damping coefficient for the plurality of devices.

51. The method of claim 46 wherein selecting the actuation signal comprises selecting an actuation signal comprising a divot.

52. A plurality of MEMS switching devices comprising:
   a) a signal source coupled to the plurality of MEMS switching devices;
   b) a processor adapted to control the signal source so as to provide an actuation signal for actuating impacting structures of a MEMS switch;
   c) the processor being configured so as to be capable of providing an actuation signal comprising a drive phase and a coast phase; and
   d) wherein the processor is configured so as to reduce rebounding of the impacting structures.

53. The apparatus of claim 52 further comprising:
   a) the processor being configured to control the signal source such that the coast phase has a start time substantially representing an average between, a maximum start time for the plurality of MEMS switching devices producing a value of a settling time of the impacting structures in conformance with a predetermined specification, and a minimum start time for the plurality of MEMS switching devices producing a value of the settling time of the impacting structures in conformance with the predetermined specification; and
   b) the processor being configured to control the signal source such that the coast phase has a corresponding duration substantially representing an average between, a maximum corresponding duration for the plurality of MEMS switching devices producing a value of the settling time of the impacting structures in conformance with a predetermined specification, and a minimum corresponding duration for the plurality of MEMS switching devices producing a value of the settling time of the impacting structures in conformance with the predetermined specification.

54. The apparatus of claim 53 wherein the processor is configured to control the signal source using the start time average and the corresponding duration average such that the coast phase is provided to all the plurality of MEMS switching devices energized by the processor.

55. The apparatus of claim 53 wherein the processor is configured to control the signal source to provide a divot such that the divot comprises the coast phase.

56. The apparatus of claim 55 wherein the processor is configured to provide substantially a same magnitude as the drive phase after the divot.

57. The apparatus of claim 52 wherein the processor is configured to control the signal source using the start time average and the corresponding duration average such that the coast phase is provided to all the plurality of MEMS switching devices energized by the processor.

58. The apparatus of claim 52 wherein the processor is configured to control the signal source to provide a divot such that the divot comprises the coast phase.

59. The apparatus of claim 58 wherein the processor is configured to provide substantially a same magnitude as the drive phase after the divot.

60. A MEMS optical switch array comprising:
   a) a signal source coupled to a plurality of MEMS optical switches;
   b) a means for controlling the signal source to provide an actuating signal for actuating impacting structures of the plurality of MEMS optical switches; and
   c) the means for controlling comprising a means for providing an actuation signal comprising a drive phase and a coast phase so as to reduce rebounding of the impacting structure.

61. The apparatus of claim 60 wherein the means for controlling further comprises:
   a) a means for controlling the signal source such that the coast phase has a start time substantially representing an average between, a maximum start time for the plurality of MEMS switches producing a value of a settling time of the impacting structures in conformance with a predetermined specification, and a minimum start time for the plurality of MEMS switches producing a value of the settling time of the impacting structures in conformance with the predetermined specification; and
   b) a means for controlling the signal source such that the coast phase has a corresponding duration substantially representing an average between, a maximum corresponding duration for the plurality of MEMS switches producing a value of the settling time of the impacting structures in conformance with a predetermined specification, and a minimum corresponding duration for the plurality of MEMS switches producing a value of the settling time of the impacting structures in conformance with the predetermined specification.

* * * * *